(12) United States Patent
Takano et al.

(10) Patent No.: US 11,585,989 B2
(45) Date of Patent: *Feb. 21, 2023

(54) SMALL FORM FACTOR FIBER OPTIC CONNECTOR WITH MULTI-PURPOSE BOOT

(71) Applicant: Senko Advanced Components Inc., Marlborough, MA (US)

(72) Inventors: Kazuyoshi Takano, Tokyo (JP); Jimmy Jun-Fu Chang, Worcester, MA (US)

(73) Assignee: Senko Advanced Components, Inc., Hudson, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/342,988

(22) Filed: Jun. 9, 2021

(65) Prior Publication Data

US 2021/0294045 A1    Sep. 23, 2021

Related U.S. Application Data

(60) Continuation of application No. 16/782,196, filed on Feb. 5, 2020, now Pat. No. 11,061,190, which is a
(Continued)

(51) Int. Cl.
| G02B 6/38 | (2006.01) |
| G02B 6/40 | (2006.01) |
| G02B 6/42 | (2006.01) |

(52) U.S. Cl.
CPC ......... *G02B 6/38875* (2021.05); *G02B 6/387* (2013.01); *G02B 6/3825* (2013.01);
(Continued)

(58) Field of Classification Search
CPC .... G02B 6/387; G02B 6/3821; G02B 6/3825; G02B 6/3831
See application file for complete search history.

(56) References Cited

U.S. PATENT DOCUMENTS

| 681,132 A | 8/1901 | Norton |
| 3,721,945 A | 3/1973 | Hults |
| (Continued) | | |

FOREIGN PATENT DOCUMENTS

| CA | 2495693 A1 | 4/2004 |
| CA | 2495693 A1 | 4/2004 |
| (Continued) | | |

OTHER PUBLICATIONS

International Search Report and Written Opinion; Application No. PCT/US2018/042202, dated Dec. 7, 2018, pp. 17.
(Continued)

*Primary Examiner* — Eric Wong

(57) ABSTRACT

An optical connector holding two or more LC-type optical ferrules is provided. The optical connector includes an outer body, an inner front body accommodating the two or more LC-type optical ferrules, ferrule springs for urging the optical ferrules towards a mating connection, and a back body for supporting the ferrule springs. A removable inner front body for polarity change is disclosed. A multi-purpose rotatable boot assembly for polarity change is disclosed. The multi-purpose boot assembly can be pushed and pulled to insert and remove the micro connector from an adapter receptacle.

20 Claims, 32 Drawing Sheets

Related U.S. Application Data division of application No. 16/368,828, filed on Mar. 28, 2019, now Pat. No. 10,705,300, and a continuation of application No. 16/103,555, filed on Aug. 14, 2018, now Pat. No. 10,718,911, which is a continuation-in-part of application No. 16/035,691, filed on Jul. 15, 2018, now Pat. No. 10,281,668.

(60) Provisional application No. 62/649,539, filed on Mar. 28, 2018, provisional application No. 62/588,276, filed on Nov. 17, 2017, provisional application No. 62/549,655, filed on Aug. 24, 2017, provisional application No. 62/532,710, filed on Jul. 14, 2017.

(52) U.S. Cl.
CPC ......... *G02B 6/3879* (2013.01); *G02B 6/3887* (2013.01); *G02B 6/3893* (2013.01); *G02B 6/403* (2013.01); *G02B 6/406* (2013.01); *G02B 6/4292* (2013.01); *G02B 6/3821* (2013.01)

(56) References Cited

U.S. PATENT DOCUMENTS

| | | |
|---|---|---|
| 4,150,790 A | 4/1979 | Potter |
| 4,240,695 A | 12/1980 | Evans |
| 4,327,964 A | 5/1982 | Haesley et al. |
| 4,478,473 A | 10/1984 | Frear |
| 4,762,388 A | 8/1988 | Tanaka et al. |
| 4,764,129 A | 8/1988 | Jones et al. |
| 4,840,451 A | 6/1989 | Sampson et al. |
| 4,872,736 A | 10/1989 | Myers et al. |
| 4,979,792 A | 12/1990 | Weber |
| 5,026,138 A | 6/1991 | Boudreau |
| 5,031,981 A | 7/1991 | Peterson |
| 5,011,025 A | 8/1991 | Haitmanek |
| 5,041,025 A | 8/1991 | Haitmanek |
| 5,073,045 A | 12/1991 | Abendschein |
| D323,143 S | 1/1992 | Ohkura et al. |
| 5,101,463 A | 3/1992 | Cubukciyan |
| 5,146,813 A | 9/1992 | Stanfill, Jr. |
| 5,159,652 A | 10/1992 | Grassin D'Alphonse |
| 5,212,752 A | 5/1993 | Stephenson et al. |
| 5,265,181 A | 11/1993 | Chang |
| 5,289,554 A | 2/1994 | Cubukciyan et al. |
| 5,315,679 A | 5/1994 | Baldwin |
| 5,317,663 A | 5/1994 | Beard et al. |
| 5,321,784 A | 6/1994 | Cubukciyan et al. |
| 5,335,301 A | 8/1994 | Newman et al. |
| 5,348,487 A | 9/1994 | Marazzi et al. |
| 5,418,875 A | 5/1995 | Nakano |
| 5,444,806 A | 8/1995 | de Marchi et al. |
| 5,481,634 A | 4/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,602,951 A | 2/1997 | Shiota |
| 5,684,903 A | 11/1997 | Kyomasu et al. |
| 5,687,268 A | 11/1997 | Stephenson et al. |
| 5,781,681 A | 7/1998 | Manning |
| 5,845,036 A | 12/1998 | De Marchi |
| 5,862,282 A | 1/1999 | Matsuura |
| 5,915,987 A | 6/1999 | Reed |
| 5,930,426 A | 7/1999 | Harting |
| 5,937,130 A | 8/1999 | Amberg et al. |
| 5,953,473 A | 9/1999 | Shimotsu |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,095,862 A | 8/2000 | Doye |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,240,228 B1 | 5/2001 | Chen |
| 6,247,849 B1 | 6/2001 | Liu |
| 6,250,817 B1 | 6/2001 | Lampert et al. |
| 6,276,840 B1 | 8/2001 | Weiss |
| 6,318,903 B1 | 11/2001 | Andrews |
| 6,364,537 B1 | 4/2002 | Maynard |
| 6,379,052 B1 | 4/2002 | de Jong |
| 6,422,759 B1 | 7/2002 | Kevern |
| 6,450,695 B1 | 9/2002 | Matsumoto |
| 6,461,054 B1 | 10/2002 | Iwase |
| 6,471,412 B1 | 10/2002 | Belenkiy et al. |
| 6,478,472 B1 | 11/2002 | Anderson et al. |
| 6,485,194 B1 | 11/2002 | Shirakawa |
| 6,527,450 B1 | 3/2003 | Miyachi |
| 6,530,696 B1 | 3/2003 | Ueda |
| 6,551,117 B2 | 4/2003 | Poplawski et al. |
| 6,565,262 B2 | 5/2003 | Childers |
| 6,572,276 B1 | 6/2003 | Theis |
| 6,579,014 B2 | 6/2003 | Melton et al. |
| 6,585,194 B1 | 7/2003 | Brushwood |
| 6,634,796 B2 | 10/2003 | de Jong |
| 6,634,801 B1 | 10/2003 | Waldron et al. |
| 6,648,520 B2 | 11/2003 | McDonald et al. |
| 6,668,113 B2 | 12/2003 | Togami |
| 6,682,228 B2 | 1/2004 | Ralhnam et al. |
| 6,685,362 B2 | 2/2004 | Burkholder et al. |
| 6,695,486 B1 | 2/2004 | Falkenberg |
| 6,811,321 B1 | 11/2004 | Schmalzigaug et al. |
| 6,817,272 B2 | 11/2004 | Holland |
| 6,854,894 B1 | 2/2005 | Yunker et al. |
| 6,869,227 B2 | 3/2005 | Del Grosso |
| 6,872,039 B2 | 3/2005 | Baus et al. |
| 6,935,789 B2 | 8/2005 | Gross, III et al. |
| 7,036,993 B2 | 5/2006 | Luther |
| 7,052,186 B1 | 5/2006 | Bates |
| 7,077,576 B2 | 7/2006 | Luther |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,261,472 B2 | 8/2007 | Suzuki et al. |
| 7,264,402 B2 | 9/2007 | Theuerkorn |
| 7,281,859 B2 | 10/2007 | Mudd et al. |
| 7,284,912 B2 | 10/2007 | Suzuki et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,347,634 B2 | 3/2008 | Gunther et al. |
| 7,354,291 B2 | 4/2008 | Caveney et al. |
| 7,331,718 B2 | 5/2008 | Yazaki et al. |
| 7,371,082 B2 | 5/2008 | Zimmell et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,473,124 B1 | 1/2009 | Briant |
| 7,510,335 B1 | 3/2009 | Su et al. |
| 7,513,695 B1 | 4/2009 | Lin et al. |
| 7,534,128 B2 | 5/2009 | Caveney et al. |
| 7,540,666 B2 | 6/2009 | Luther |
| 7,561,775 B2 | 7/2009 | Lin et al. |

(56) References Cited

U.S. PATENT DOCUMENTS

| | | |
|---|---|---|
| 7,588,373 B1 | 9/2009 | Sato |
| 7,591,595 B2 | 9/2009 | Lue et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,712,970 B1 | 5/2010 | Lee |
| 7,717,625 B2 | 5/2010 | Margolin et al. |
| 7,824,113 B2 | 11/2010 | Wong et al. |
| 7,837,395 B2 | 11/2010 | Lin et al. |
| D641,708 S | 7/2011 | Tammauchi |
| 8,083,450 B1 | 12/2011 | Smith et al. |
| 8,152,385 B2 | 4/2012 | de Jong |
| 8,186,890 B2 | 5/2012 | Lu |
| 8,192,091 B2 | 6/2012 | Hsu et al. |
| 8,202,009 B2 | 6/2012 | Lin et al. |
| 8,221,007 B2 | 7/2012 | Peterhans |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,414,196 B2 | 4/2013 | Lu |
| 8,465,317 B2 | 6/2013 | Gniadek et al. |
| 8,534,928 B2 | 9/2013 | Cooke |
| 8,550,728 B2 | 10/2013 | Takahashi |
| 8,556,645 B2 | 10/2013 | Crain |
| 8,559,781 B2 | 10/2013 | Childers |
| 8,622,634 B2 | 1/2014 | Arnold |
| 8,636,424 B2 | 1/2014 | Kuffel et al. |
| 8,651,749 B2 | 2/2014 | Clovis et al. |
| 8,676,022 B2 | 3/2014 | Jones |
| 8,678,670 B2 | 3/2014 | Takahashi |
| 8,727,638 B2 | 5/2014 | Lee |
| 8,757,894 B2 | 6/2014 | Katoh |
| 8,764,308 B2 | 7/2014 | Irwin |
| 8,770,863 B2 | 7/2014 | Cooke et al. |
| 8,869,661 B2 | 10/2014 | Opstad |
| 9,052,474 B2 | 6/2015 | Jiang |
| 9,063,296 B2 | 6/2015 | Dong |
| 9,250,399 B2 | 2/2016 | Margolin et al. |
| 9,250,402 B2 | 2/2016 | Ishii et al. |
| 9,310,569 B2 | 4/2016 | Lee |
| 9,366,829 B2 | 6/2016 | Czosnowski |
| 9,411,110 B2 | 8/2016 | Barnette, Jr. et al. |
| 9,448,370 B2 | 9/2016 | Xue et al. |
| 9,465,172 B2 | 10/2016 | Shih |
| 9,494,744 B2 | 11/2016 | de Jong |
| 9,548,557 B2 | 1/2017 | Liu |
| 9,551,842 B2 | 1/2017 | Theuerkorn |
| 9,557,495 B2 | 1/2017 | Raven et al. |
| 9,568,686 B2 | 2/2017 | Fewkes et al. |
| 9,581,768 B1 | 2/2017 | Baca et al. |
| 9,599,778 B2 | 3/2017 | Wong et al. |
| 9,658,409 B2 | 5/2017 | Gniadek |
| 9,678,283 B1 | 6/2017 | Chang et al. |
| 9,684,130 B2 | 6/2017 | Veatch et al. |
| 9,684,136 B2 | 6/2017 | Cline et al. |
| 9,684,313 B2 | 6/2017 | Chajec |
| 9,709,753 B1 | 8/2017 | Chang et al. |
| 9,778,425 B2 | 10/2017 | Nguyen |
| 9,829,644 B2 | 11/2017 | Nguyen |
| 9,829,645 B2 | 11/2017 | Good |
| 9,829,653 B1 | 11/2017 | Nishiguchi |
| 9,869,825 B2 | 1/2018 | Bailey et al. |
| 9,880,361 B2 | 1/2018 | Childers |
| 9,946,035 B2 | 4/2018 | Gustafson |
| 9,971,103 B2 | 5/2018 | de Jong et al. |
| 9,989,711 B2 | 6/2018 | Ott et al. |
| 10,031,296 B2 | 7/2018 | Good |
| 10,067,301 B2 | 9/2018 | Murray |
| 10,107,972 B1 | 10/2018 | Gniadek et al. |
| 10,114,180 B2 | 10/2018 | Suzic |
| 10,146,011 B2 | 12/2018 | Nhep |
| 10,281,668 B2 | 5/2019 | Takano et al. |
| 10,281,669 B2 | 5/2019 | Takano et al. |
| 2002/0168148 A1 | 11/2002 | Gilliland |
| 2002/0172467 A1 | 11/2002 | Anderson et al. |
| 2002/0191919 A1 | 12/2002 | Nolan |
| 2003/0053787 A1 | 3/2003 | Lee |
| 2003/0063862 A1 | 4/2003 | Fillion |
| 2003/0157825 A1 | 8/2003 | Kane |
| 2004/0052473 A1 | 3/2004 | Seo |
| 2004/0109646 A1 | 6/2004 | Anderson |
| 2004/0161958 A1 | 6/2004 | Togami et al. |
| 2004/0136657 A1 | 7/2004 | Ngo |
| 2004/0141693 A1 | 7/2004 | Szilagyi et al. |
| 2004/0234209 A1 | 11/2004 | Cox et al. |
| 2004/0247252 A1 | 12/2004 | Ehrenreich |
| 2005/0036744 A1 | 2/2005 | Caveney et al. |
| 2005/0111796 A1 | 5/2005 | Matasek et al. |
| 2005/0135755 A1 | 6/2005 | Kiani et al. |
| 2005/0141817 A1 | 6/2005 | Yazaki et al. |
| 2006/0013539 A1 | 1/2006 | Thaler |
| 2006/0076061 A1 | 4/2006 | Bush |
| 2006/0089049 A1 | 4/2006 | Sedor |
| 2006/0127025 A1 | 6/2006 | Haberman |
| 2006/0153503 A1 | 7/2006 | Suzuki |
| 2006/0160429 A1 | 7/2006 | Dawiedczyk et al. |
| 2006/0193562 A1 | 8/2006 | Theuerkorn |
| 2006/0269194 A1 | 11/2006 | Luther et al. |
| 2006/0274411 A1 | 12/2006 | Yamauchi |
| 2007/0025665 A1 | 2/2007 | Dean |
| 2007/0028409 A1 | 2/2007 | Yamada |
| 2007/0079854 A1 | 4/2007 | You |
| 2007/0098329 A1 | 6/2007 | Shimoji et al. |
| 2007/0149028 A1 | 6/2007 | Yu et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0013896 A1 | 1/2008 | Salzberg et al. |
| 2008/0044137 A1 | 2/2008 | Luther et al. |
| 2008/0056647 A1 | 3/2008 | Margolin et al. |
| 2008/0064334 A1 | 3/2008 | Hamadi |
| 2008/0069501 A1 | 3/2008 | Mudd et al. |
| 2008/0101757 A1 | 5/2008 | Lin et al. |
| 2008/0226237 A1 | 9/2008 | O'Rioreden et al. |
| 2008/0267566 A1 | 10/2008 | En Lin |
| 2009/0028507 A1 | 1/2009 | Jones et al. |
| 2009/0047818 A1 | 2/2009 | Irwin et al. |
| 2009/0092360 A1 | 4/2009 | Lin et al. |
| 2009/0176401 A1 | 7/2009 | Gu |
| 2009/0196555 A1 | 8/2009 | Lin et al. |
| 2009/0214162 A1 | 8/2009 | O'Riorden et al. |
| 2009/0220197 A1 | 9/2009 | Gniadek |
| 2009/0220200 A1 | 9/2009 | Wong et al. |
| 2009/0222457 A1 | 9/2009 | Gallant |
| 2009/0290839 A1 | 11/2009 | En Lin |
| 2009/0290938 A1 | 11/2009 | Asaoka |
| 2010/0034502 A1 | 2/2010 | Lu et al. |
| 2010/0054668 A1 | 3/2010 | Nelson |
| 2010/0061069 A1 | 3/2010 | Cole |
| 2010/0092136 A1 | 4/2010 | Nhep |
| 2010/0220961 A1 | 9/2010 | de Jong et al. |
| 2010/0247041 A1 | 9/2010 | Szilagyi |
| 2010/0284656 A1 | 11/2010 | Morra |
| 2010/0322561 A1 | 12/2010 | Lin et al. |
| 2011/0044588 A1 | 2/2011 | Larson et al. |
| 2011/0058773 A1 | 3/2011 | Peterhans |
| 2011/0131801 A1 | 6/2011 | Nelson et al. |
| 2011/0155810 A1 | 6/2011 | Taniguichi |
| 2011/0177710 A1 | 7/2011 | Tobey |
| 2011/0239220 A1 | 9/2011 | Gibson |
| 2012/0099822 A1 | 4/2012 | Kuffel et al. |
| 2012/0155810 A1 | 6/2012 | Nakagawa |
| 2012/0189260 A1 | 7/2012 | Kowalczyk et al. |
| 2012/0237177 A1 | 9/2012 | Minota |
| 2012/0269485 A1 | 10/2012 | Haley et al. |
| 2012/0301080 A1 | 11/2012 | Gniadek |
| 2012/0308183 A1 | 12/2012 | Irwin |
| 2012/0328248 A1 | 12/2012 | Larson |
| 2013/0019423 A1 | 1/2013 | Srutkowski |
| 2013/0071067 A1 | 3/2013 | Lin |

(56) References Cited

U.S. PATENT DOCUMENTS

| | | |
|---|---|---|
| 2013/0089995 A1 | 4/2013 | Gniadek et al. |
| 2013/0094816 A1 | 4/2013 | Lin et al. |
| 2013/0101258 A1 | 4/2013 | Hikosaka |
| 2013/0121653 A1 | 5/2013 | Shitama et al. |
| 2013/0170797 A1 | 7/2013 | Ott |
| 2013/0183012 A1 | 7/2013 | Lopez et al. |
| 2013/0216185 A1 | 8/2013 | Klavuhn |
| 2013/0259429 A1 | 10/2013 | Czosnowski et al. |
| 2013/0308915 A1 | 11/2013 | Buff |
| 2013/0322825 A1 | 12/2013 | Cooke et al. |
| 2014/0016901 A1 | 1/2014 | Lamboum et al. |
| 2014/0023322 A1 | 1/2014 | Gniadek |
| 2014/0050446 A1 | 2/2014 | Chang |
| 2014/0056562 A1 | 2/2014 | Limbert |
| 2014/0133808 A1 | 5/2014 | Hill et al. |
| 2014/0169727 A1 | 6/2014 | Veatch et al. |
| 2014/0219621 A1 | 8/2014 | Barnette, Jr. et al. |
| 2014/0226946 A1 | 8/2014 | Cooke et al. |
| 2014/0241644 A1 | 8/2014 | Kang |
| 2014/0241678 A1 | 8/2014 | Bringuier et al. |
| 2014/0241688 A1 | 8/2014 | Isenhour et al. |
| 2014/0334780 A1 | 11/2014 | Nguyen et al. |
| 2014/0348477 A1 | 11/2014 | Chang |
| 2015/0003788 A1 | 1/2015 | Chen |
| 2015/0378841 A1 | 1/2015 | Chen |
| 2015/0111417 A1 | 4/2015 | Vanderwoud |
| 2015/0177463 A1 | 6/2015 | Lee |
| 2015/0198766 A1 | 7/2015 | Takahashi |
| 2015/0212282 A1 | 7/2015 | Lin |
| 2015/0241644 A1 | 8/2015 | Lee |
| 2015/0301294 A1 | 10/2015 | Chang et al. |
| 2015/0331201 A1 | 11/2015 | Takano et al. |
| 2015/0355417 A1 | 12/2015 | Takano et al. |
| 2015/0370021 A1 | 12/2015 | Chan |
| 2015/0378113 A1 | 12/2015 | Good et al. |
| 2016/0131849 A1 | 5/2016 | Takano et al. |
| 2016/0139343 A1 | 5/2016 | Dean, Jr. et al. |
| 2016/0161681 A1 | 6/2016 | Banal, Jr. et al. |
| 2016/0172852 A1 | 6/2016 | Tamura |
| 2016/0178852 A1 | 6/2016 | Takano |
| 2016/0195682 A1 | 6/2016 | Takano |
| 2016/0291262 A1 | 6/2016 | Chang et al. |
| 2016/0231512 A1 | 8/2016 | Seki |
| 2016/0259135 A1 | 9/2016 | Gniadek et al. |
| 2016/0266326 A1 | 9/2016 | Gniadek |
| 2016/0320572 A1 | 11/2016 | Gniadek |
| 2016/0349458 A1 | 12/2016 | Murray |
| 2016/0370545 A1 | 12/2016 | Jiang |
| 2017/0003458 A1 | 1/2017 | Gniadek |
| 2017/0205587 A1 | 7/2017 | Chang et al. |
| 2017/0205590 A1 | 7/2017 | Bailey |
| 2017/0205591 A1 | 7/2017 | Takano et al. |
| 2017/0212313 A1 | 7/2017 | Elenabaas |
| 2017/0212316 A1 | 7/2017 | Takano |
| 2017/0254961 A1 | 9/2017 | Kamada et al. |
| 2017/0276275 A1 | 9/2017 | Beemer et al. |
| 2017/0276887 A1 | 9/2017 | Allen |
| 2017/0277059 A1 | 9/2017 | Miura et al. |
| 2017/0343740 A1 | 11/2017 | Nguyen |
| 2018/0128988 A1 | 5/2018 | Chang |
| 2018/0156982 A1* | 6/2018 | Lu ..................... G02B 6/3885 |
| 2018/0156988 A1 | 6/2018 | Gniadek |
| 2018/0172923 A1 | 6/2018 | Bauco |
| 2018/0252872 A1 | 9/2018 | Chen |
| 2018/0341069 A1 | 11/2018 | Takano |
| 2019/0064447 A1 | 2/2019 | Chang et al. |
| 2019/0204513 A1 | 7/2019 | Davidson et al. |
| 2021/0263238 A1* | 8/2021 | Tseng .................. G02B 6/3869 |

FOREIGN PATENT DOCUMENTS

| | | |
|---|---|---|
| CN | 2836038 Y | 11/2006 |
| CN | 2836038 Y | 11/2006 |
| CN | 201383588 Y | 1/2010 |
| CN | 201383588 Y | 1/2010 |
| CN | 2026500189 U | 12/2013 |
| CN | 106997078 | 8/2017 |
| DE | 19507669 A1 | 9/1996 |
| DE | 202006011910 U1 | 3/2007 |
| DE | 102006019335 U1 | 10/2007 |
| EP | 1074868 A1 | 2/2001 |
| EP | 1074868 A1 | 7/2001 |
| EP | 1211537 A2 | 6/2002 |
| EP | 1211537 A3 | 6/2002 |
| EP | 1245980 A1 | 10/2002 |
| EP | 1566674 A2 | 8/2005 |
| GB | 2111240 A | 6/1983 |
| JP | 2000089059 A | 3/2000 |
| JP | 03752331 B2 | 3/2006 |
| JP | 2009229545 A | 10/2009 |
| JP | 2009276493 A | 11/2009 |
| JP | 04377820 B2 | 12/2009 |
| JP | 2011027876 A | 2/2011 |
| JP | 2012053375 A | 3/2012 |
| KR | 20040028409 A | 4/2006 |
| KR | 2009005382 A | 1/2009 |
| KR | 200905382 U | 6/2009 |
| KR | 1371686 B1 | 3/2014 |
| TW | 200821653 A | 5/2008 |
| WO | 200179904 A2 | 10/2001 |
| WO | WO2001079904 A2 | 10/2001 |
| WO | 2004027485 A1 | 4/2004 |
| WO | WO2006007120 A1 | 1/2006 |
| WO | 2008112986 A1 | 9/2008 |
| WO | 2009135787 A1 | 11/2009 |
| WO | 2010024851 A2 | 3/2010 |
| WO | 2012136702 A1 | 10/2012 |
| WO | 2012162385 A1 | 11/2012 |
| WO | WO2012162385 A1 | 11/2012 |
| WO | 2014028527 A1 | 2/2014 |
| WO | 2014182351 A1 | 11/2014 |
| WO | WO2015103783 A1 | 7/2015 |
| WO | 2015191024 A1 | 12/2015 |
| WO | 2016019993 A1 | 2/2016 |
| WO | 2016148741 A1 | 9/2016 |
| WO | WO2019126333 A1 | 6/2019 |

OTHER PUBLICATIONS

International Search Report and Written Opinion, Application No. PCT/US2019/013861, dated Apr. 8, 2019, pp. 15.
Fiber Optic Connectors Tutorial, 2018, pp. 20.
Fiber Optic Glossary, Feb. 29, 2016, pp. 93.
"Fiber Optic Interconnect Solutions, Tactical Fiber Optical Connectors, Cables and Termini" 2006, Glenair, Inc., Glendale, California, www.mps-electronics.de, pp. 232.
"Fiber Optic Products Catalog" Nov. 2007, Tyco Electronics Corporation, Harrisburg, Pennsylvania, www.ampnetconnect.com, pp. 204.
"Fiber Optic Connectors and Assemblies Catalog" 2009, Huber & Suhner Fiver Optics, Herisau, Switzerland, www.hubersuhner.com, pp. 104.
PCT/US2018/062406 International Search Report dated Mar. 18, 2019.
PCT/US2018/062406 The written Opinion dated Mar. 18, 2019.
PCT/US2018/062405 International Search Report dated Apr. 3, 2019.
PCT/US2018/062405 The written Opinion dated Apr. 3, 2019.
PCT/IB2018/056133 Written Opinion dated Jan. 3, 2019.
PCY/IB/056133 Search Report dated Jan. 3, 2019.
Final Office Action, U.S. Appl. No. 16/035,691, dated Feb. 11, 2019, pp. 8.
Non-Final Office Action, U.S. Appl. No. 16/035,695, dated Sep. 28, 2018, pp. 7.
International Search Report and Written Opinion, Application No. PCT/US/2018/042202, pp. 17, dated Dec. 7, 2018.
International Search Report and Written Opinion, Application No. PCT/US19/24718, dated Jun. 26, 2019, pp. 7.
ISR for PCT/US2019/013861, Apr. 8, 2019, 3 pages.
WO for PCT/US2019/013861, Apr. 8, 2019, 11 pages.

(56) References Cited

OTHER PUBLICATIONS

International Search Report and Written Opinion for Application No. PCT/US2018/62406 dated Mar. 18, 2019, 12, pages, United States.
International Search Report and Written Opinion for Application No. PCT/US2019/40700 dated Sep. 27, 2019, 12, pages, United States.
International Search Report and Written Opinion for Application No. PCT/US2019/50895 dated Jan. 6, 2020, 12, pages, United States.
International Search Report and Written Opinion for Application No. PCT/US2019/50909 dated Dec. 17, 2019, 11, pages, United States.
International Search Report and Written Opinion for Application No. PCT/US2019/56564 dated Jan. 14, 2020, 14, pages, United States.
International Search Report and Written Opinion, Application No. PCT/US19/46397, dated Nov. 12, 2019, pp. 6.
International Search Report; PCT/US2018/042202 filed Jul. 16, 2018; Applicant: Senko Advanced Components, Inc.
International Preliminary Report on Patentability for PCT/US2019/022940 dated Oct. 1, 2020, 11 pages.
Extended European Search Report and Written Opinion, Application No. 18832246.5, dated Mar. 15, 2021, pp. 6.

* cited by examiner

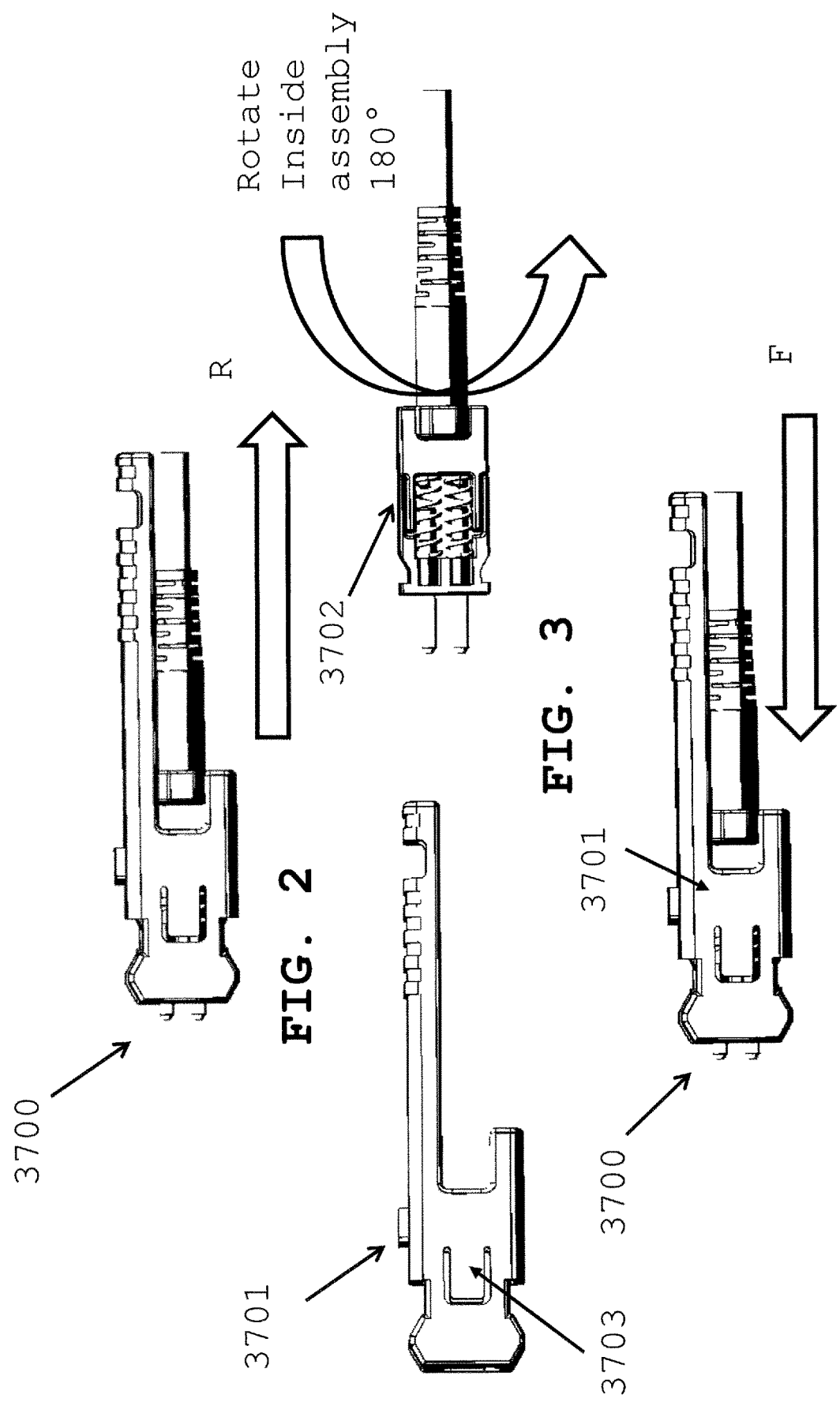

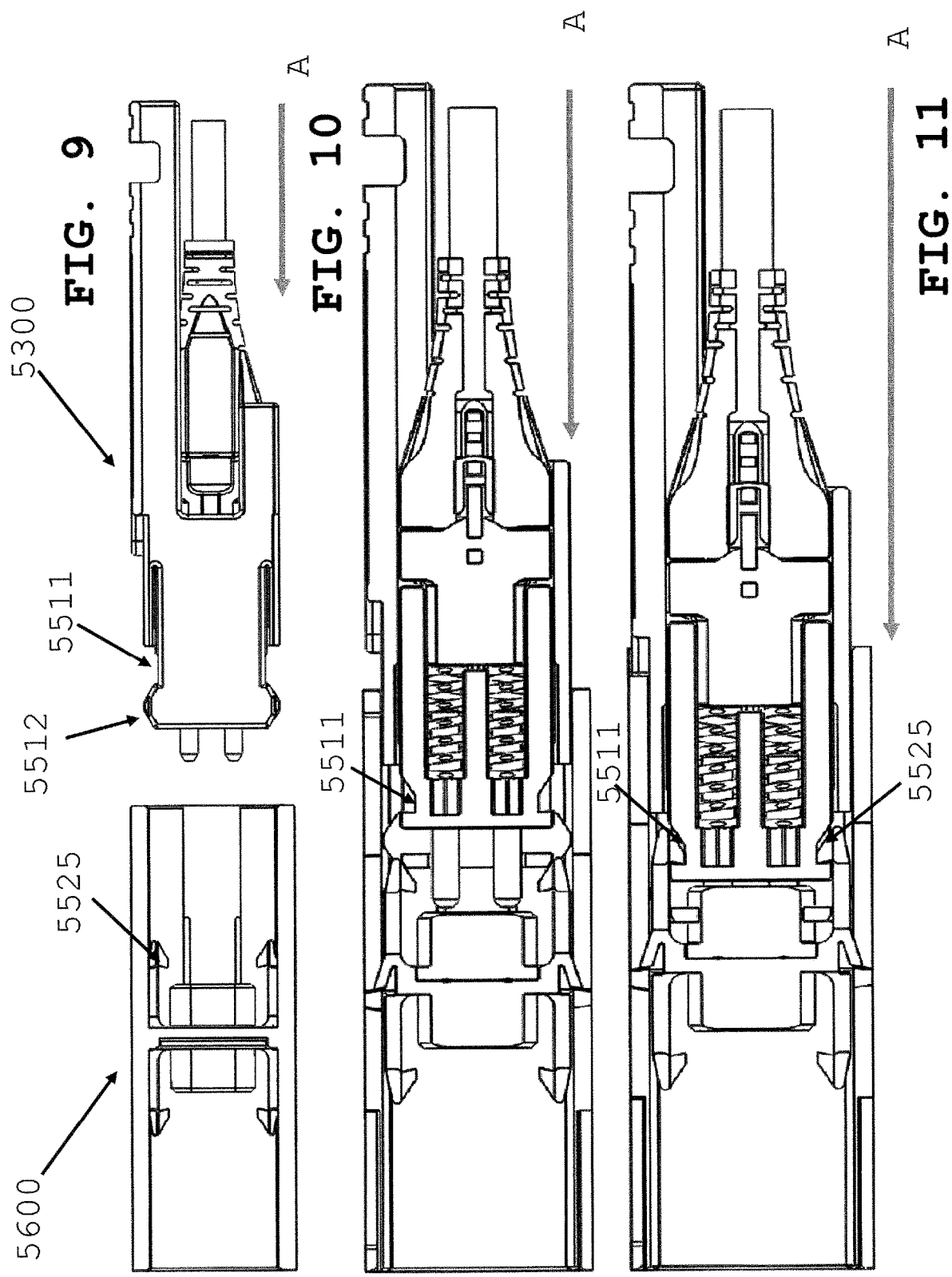

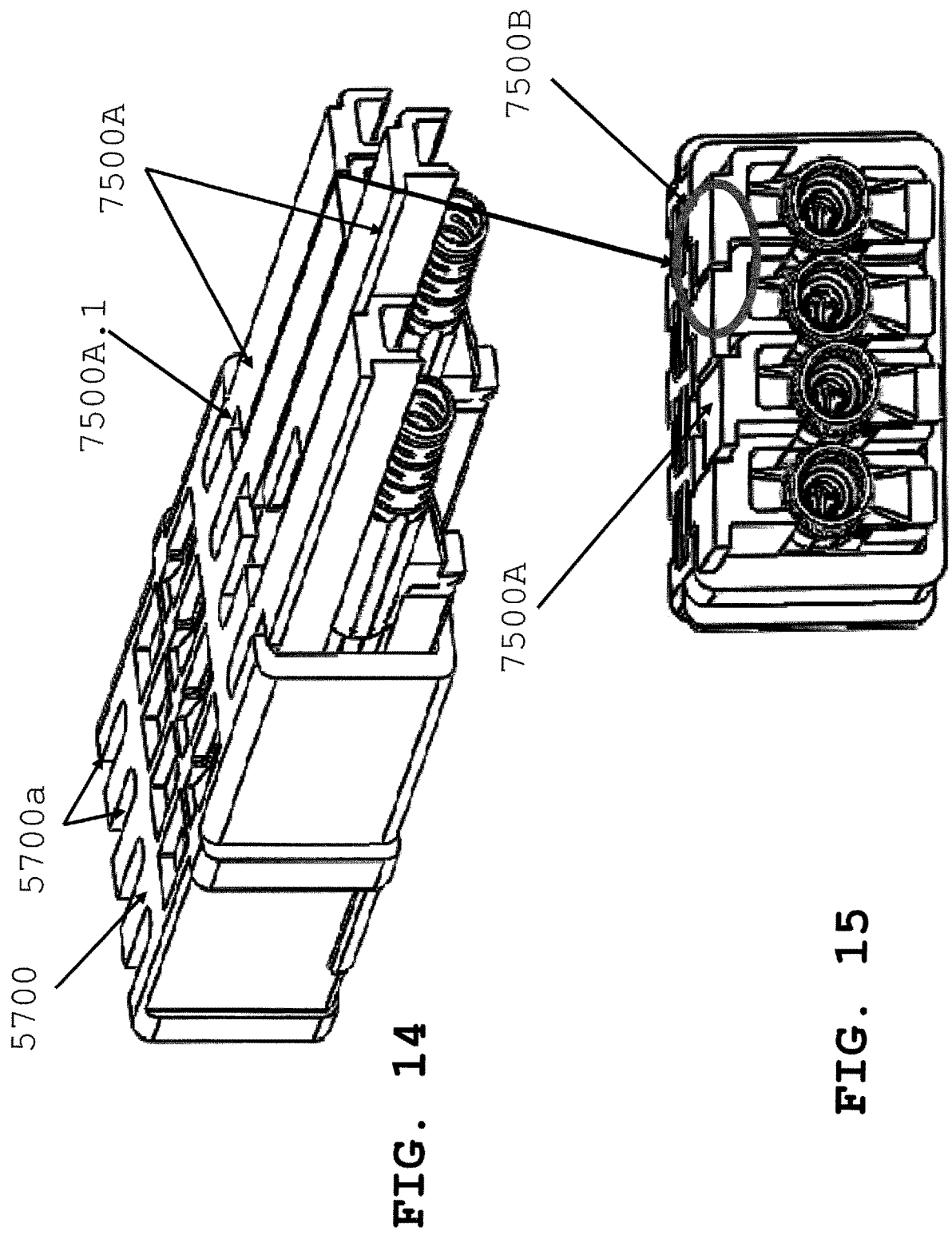

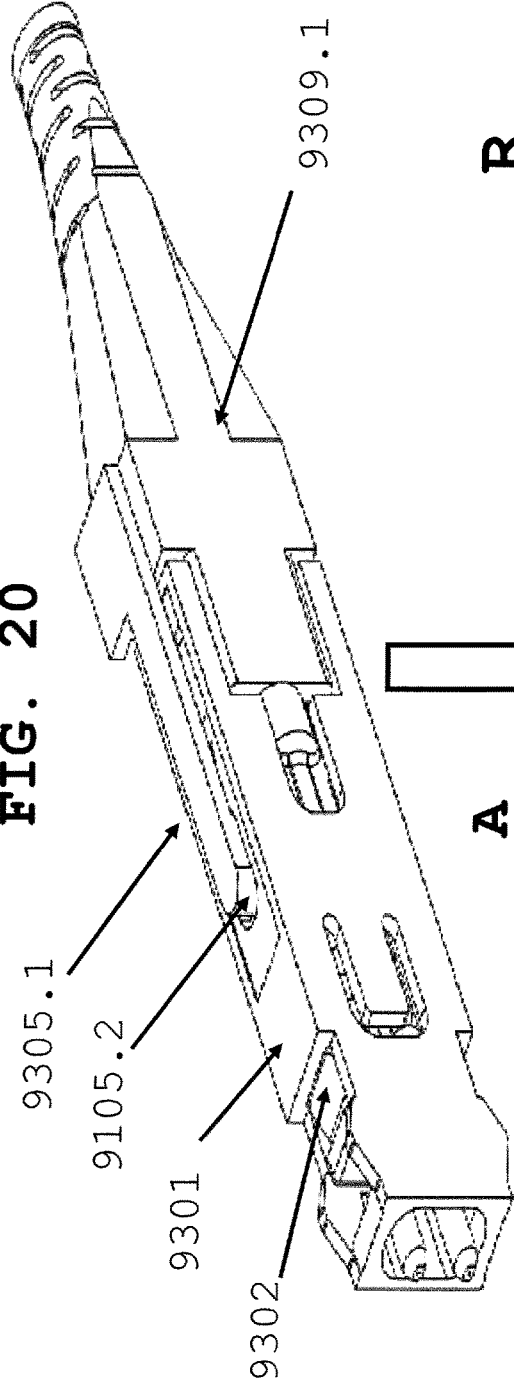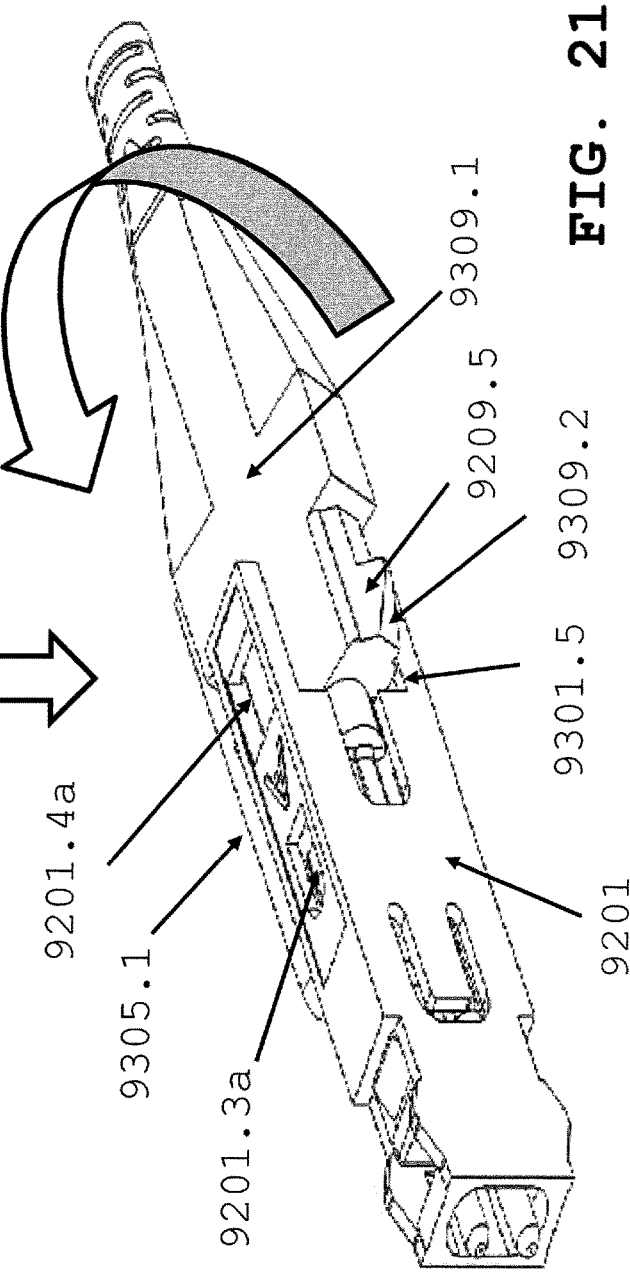

SMALL FORM FACTOR FIBER OPTIC CONNECTOR WITH MULTI-PURPOSE BOOT

RELATED APPLICATIONS

This application is a divisional under 35 USC 121 that claims priority to U.S. patent application Ser. No. 16/782, 196, titled "Small Form Factor Fiber Optic Connector with Multi-Purpose Boot Assembly", filed on Feb. 5, 2020, which claims priority to U.S. application Ser. No. 16/368,828, titled "Small Factor Fiber Optic Connector with Multi-Purpose Boot", filed on Mar. 28, 2018, which claims priority to U.S. Patent Application 62/649,539 titled "Micro Connector with Multi-Purpose Boot", filed on Mar. 28, 2018; and further claims priority to U.S. Patent with Ser. No. 16/103,555 filed on Aug. 14, 2018 entitled "Ultra-Small Form Factor Optical Connectors Using A Push-Pull Boot Receptacle Release", which is a continuation in-part of U.S. patent application Ser. No. 16/035,691 filed Jul. 15, 2018, entitled "Ultra-Small Factor Optical Connectors", which claims priority from U.S. Provisional Application Ser. No. 62/588,276 filed Nov. 17, 2017; U.S. Provisional Application Ser. No. 62/549,655 filed Aug. 24, 2017; and U.S. Provisional Application Ser. No. 62/532,710 filed Jul. 14, 2017 all of the above applications are incorporated by reference in this non-provisional patent application.

FIELD OF THE INVENTION

The present disclosure relates generally to ultra-small form factor optical connectors, termed "micro optical connectors," and related connections within adapters and optical transceivers.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connects, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

BRIEF DESCRIPTION OF THE DRAWINGS

FIGS. 2-4 depict a technique polarity changing of the micro connector of FIG. 1

FIG. 9-11 depict inserting the micro-connector of FIG. 1 into an adapter.

FIG. 14 is a perspective view of micro connectors of FIG. 1 inserted into an adapter.

FIG. 15 is a perspective rear view of a group of micro connectors of FIG. 14.

FIG. 20 is a perspective view of the micro connector in a first polarity position.

FIG. 21 is a perspective view of the connector of FIG. 20 being rotated in direction "R" to a second polarity.

FIG. 34 is a perspective view along a longitudinal cross section of a micro connector of FIG. 16, latched into an adapter receptacle with multi-purpose rotatable boot assembly biased forward or pushed in.

DETAILED DESCRIPTION

The following terms shall have, for the purposes of this application, the respective meanings set forth below.

A connector, as used herein, refers to a device and/or components thereof that connects a first module or cable to a second module or cable. The connector maybe configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector maybe generally defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suikeyle transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high density panel without damaging surrounding connectors, accidentally disconnecting surrounding connectors, disrupting transmissions through surrounding connectors, and/or the like. Various embodiments also provide narrow pitch LC duplex connectors and narrow width multi-fiber connectors, for use, for example, with future narrow pitch LC SFPs and future narrow width SFPs. The remote release mechanisms allow use of the narrow pitch LC duplex connectors and narrow width multi-fiber connectors in dense arrays of narrow pitch LC SFPs and narrow width multi-fiber SFPs.

Figure 1:
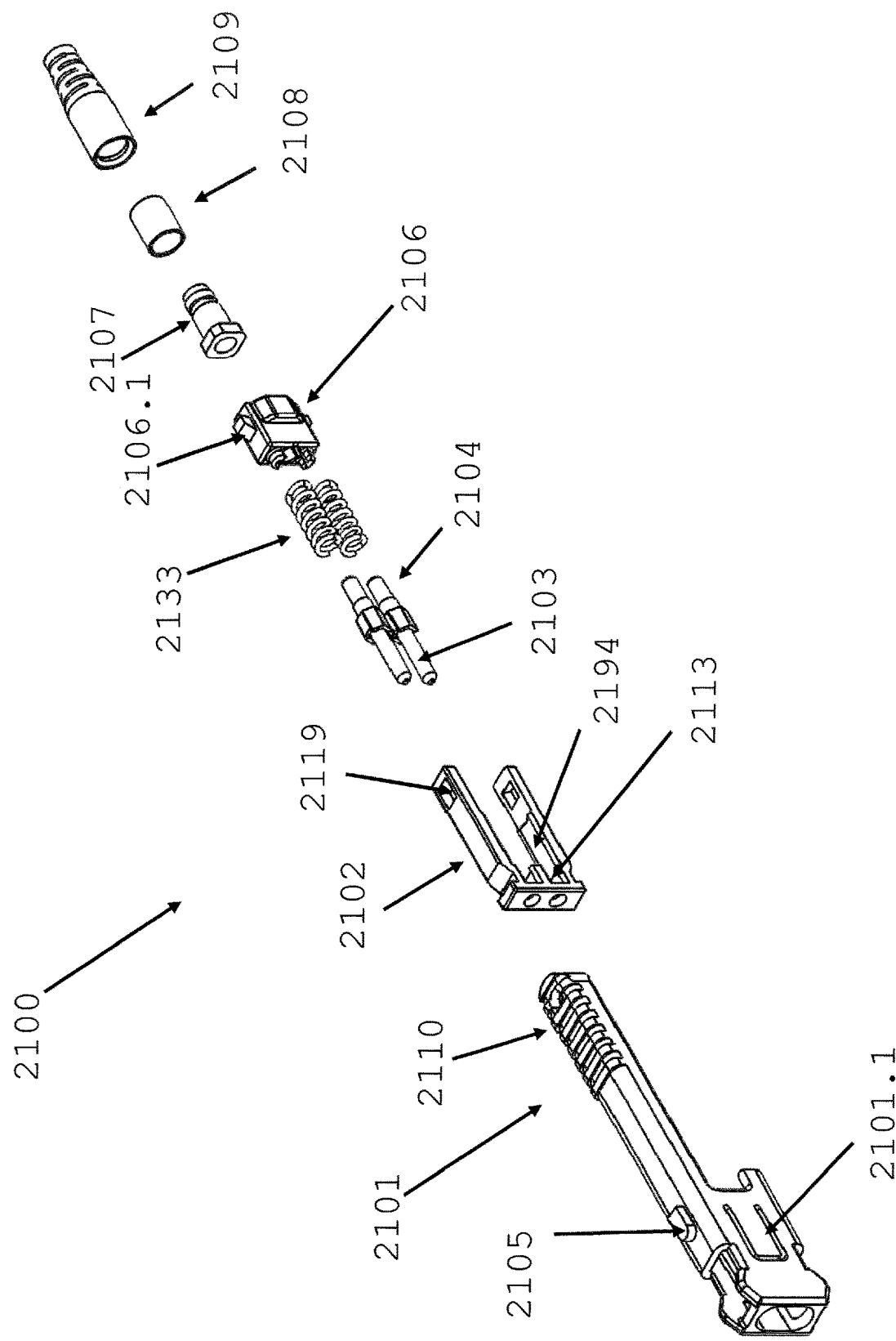
FIG. 1 is an exploded view of a micro optical connector improved according to disclosed embodiments of push/pull and polarity change in present invention.

FIG. 1 depicts an embodiment of micro optical connector 2100, shown in exploded view. Micro optical connector 2100 may include outer housing 2101, front body 2102, one or more ferrules 2103, one or more ferrule flanges 2104, one or more springs 2133, back body 2106, the latter has a wing 2106.1 on the top and bottom of the body, the wing 2106.1 is secured within an opening 2119 at a distal end of front body 2102, back post 2107, crimp ring 2108, and boot 2109. Front body 2102 side walls are open not closed, a channel 2194 for aligning ferrule flanges 2104, and an alignment sleeve opening 2113 to accept ferrule 2103. Outer housing 2101 may include a longitudinal bore for accommodating front body 2102 and ferrule 2103, springs 2133 and back body 2106, connector alignment key 2105 used during interconnection, connector flap 2101.1 and an optional pull key 2110 to facilitate removal of connector 2100 when connected in a dense array of optical connectors. Optionally, the ferrules may be LC-type ferrules having an outer diameter of 1.25 mm. Connector flap 2101.1 secures front body 2102 within outer housing 2101. Alignment key 2105 is also used as blocking structure to indicated connector polarity orientation as disclosed herein. Polarity is determined by the ferrules 9203 (Refer to FIG. 19), where a first ferrule is for Tx or transmit and a second ferrule is for Rx or receive. As known in the art, a mismatch of ferrules 9203 with opposing ferrules secured in an opposing adapter port, the signal would be lost. Alignment key performs a dual function, when the boot assembly is rotated, the alignment key is repositioned, so upon insertion into an adapter, the connector can be blocked by the key. This in effect disallows the user to insert the connector within the adapter receptacle, thus, preventing a mismatch of signal between opposing connectors across an adapter interface. As disclosed below, starting at FIG. 18 an additional aid may be markings located on the connector housing, indicating "A" or "B" polarity of the connector ferrules after rotating the boot.

As depicted FIGS. 2-4, FIG. 2 micro connector 3700 includes an assembled front body 3702 that may be removed from outer housing 3701, rotated 180° as indicated by the arrow (FIG. 3), and re-inserted into the outer housing (FIG. 4). This allows for a change in the polarity of the connector by removing and rotating front body 3702, and therefore the ferrules can be switched quickly and easily without unnecessarily risking the delicate fiber cables and ferrules. Referring to FIG. 2, micro connector 3700 is fully assembled. To remove front body 3702 to change connector polarity, as shown in FIG. 3, one or more flex key 3703 are lifted outward to release front body 3702 for removal in rearward in the direction of the arrow "R". Referring to FIG. 4, to complete the polarity change, after rotating front body 3702 by 180 degrees as shown in FIG. 3, front body 3702 is inserted into the outer housing in the direction of arrow "F".

Figure 5:
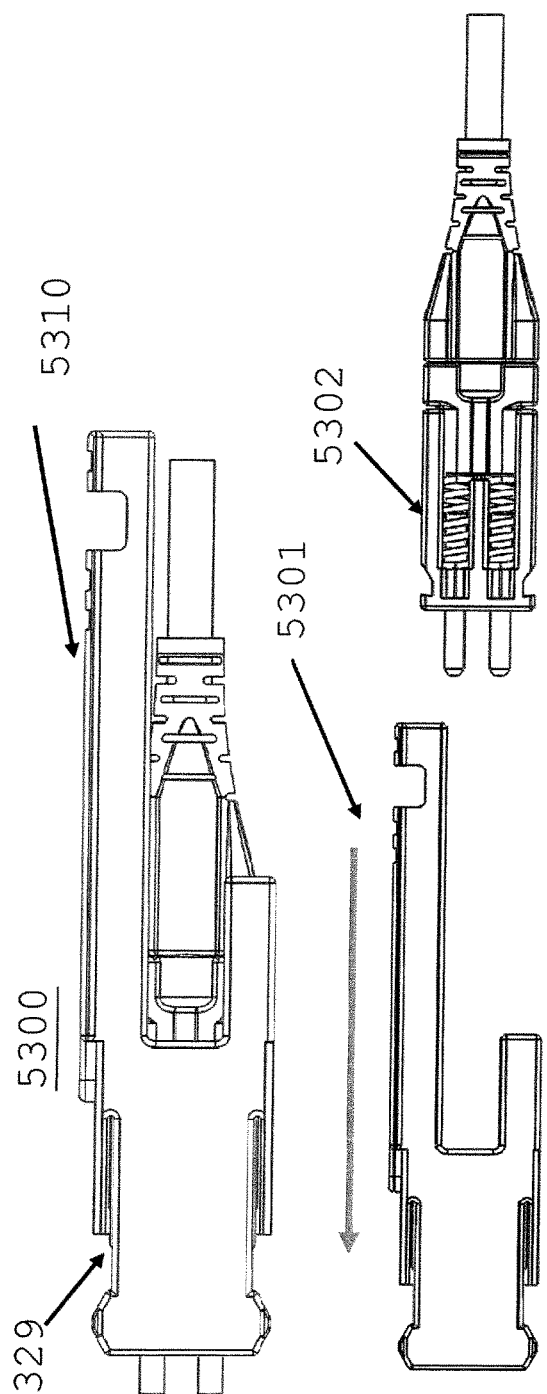
FIGS. 5-8 depict polarity changing according to an another embodiment of the present invention of a micro-connector.
Figure 6:
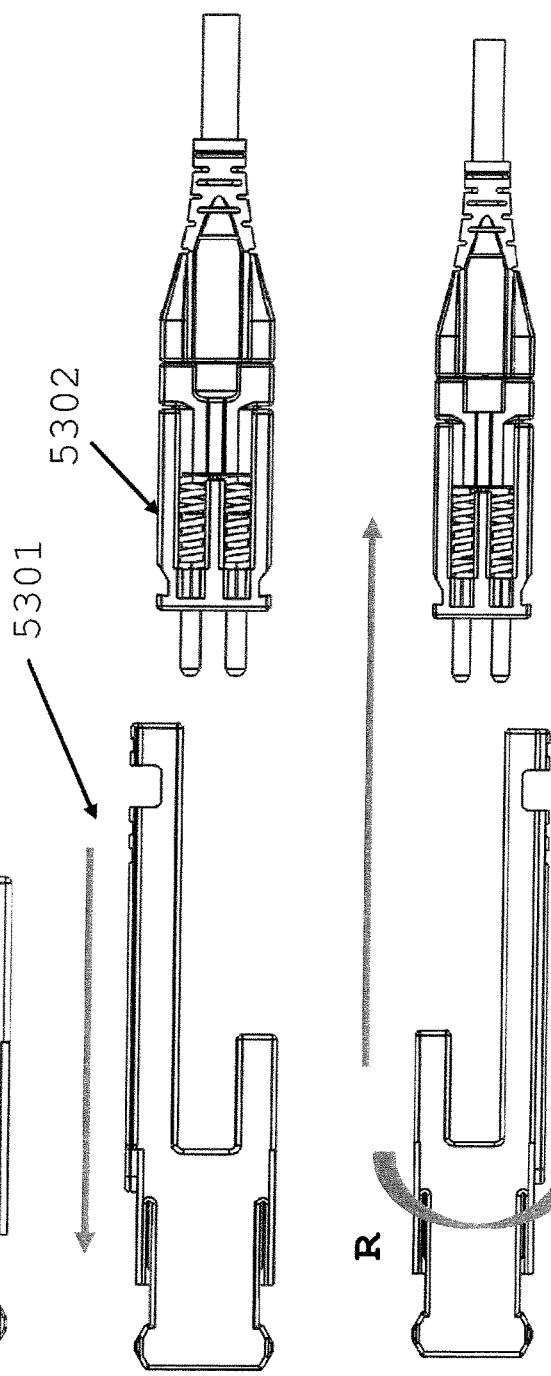
Figure 7:
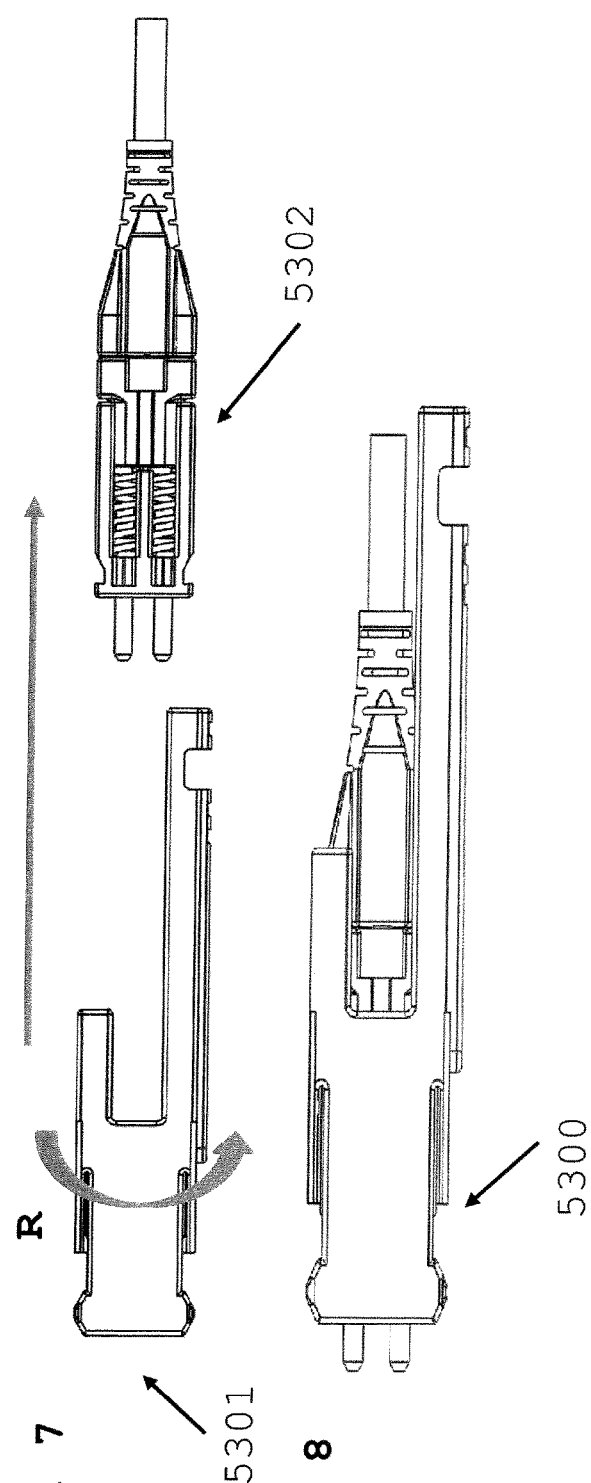
Figure 8:
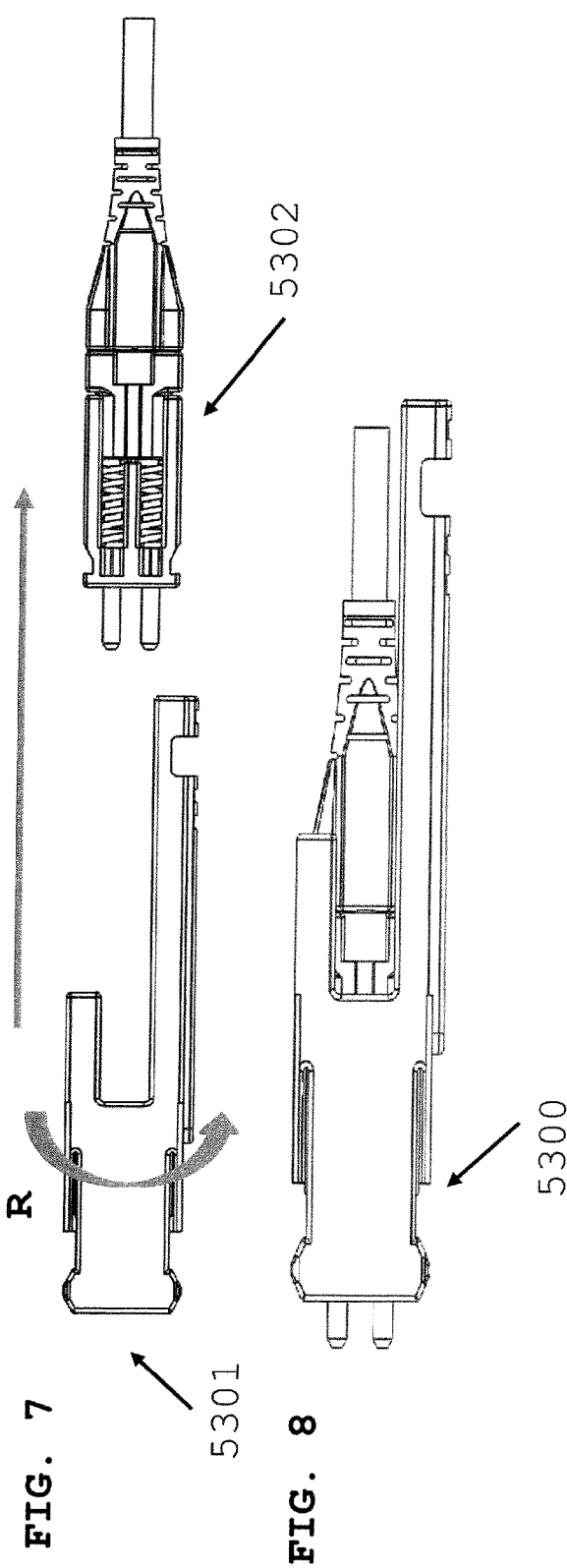

FIG. 5 depicts the operation of the polarity change mechanism using outer housing 5301 (refer to FIG. 6), where pull key 5310 is integrated with the outer housing. In FIG. 5, micro connector 5300 is fully assembled. The user inserts a tool in access slot 5329 and lifts off outer housing 5301, instead of flexible keys 3703 (refer to FIG. 3). Front body 5302 is removed with the boot and cable attached as shown in FIG. 6. Turning to FIG. 7, the outer housing 5301 is rotated 180 degrees, as shown by the arrow "R", and placed back over front body 5302 in the direction of the second arrow as shown. The reversed polarity micro connector 5300 is shown fully assembled in FIG. 8.

Referring to FIG. 9, micro connector 5300 is shown just prior to insertion into adapter 5600. Connector 5300 is partially inserted in FIG. 10, wherein connector hook (or adapter hook) 5525 has not yet been seated in the connector recess 5511, and FIG. 11 depicts hook 5525 seated in recess 5511, in direction of arrow "A".

Figure 12:
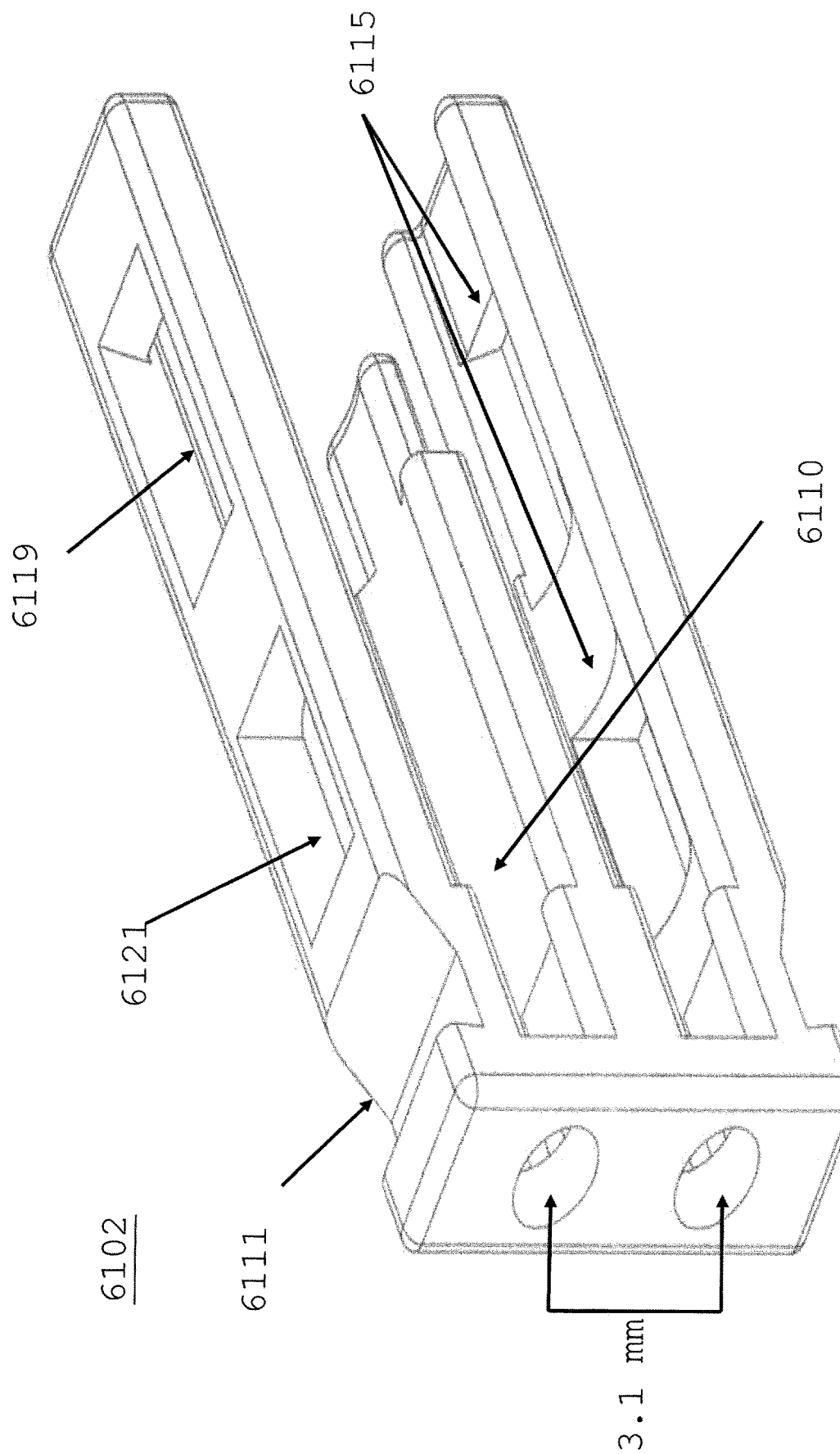
FIG. 12 is a perspective view of a front body according to an embodiment of the present invention.
Figure 13:
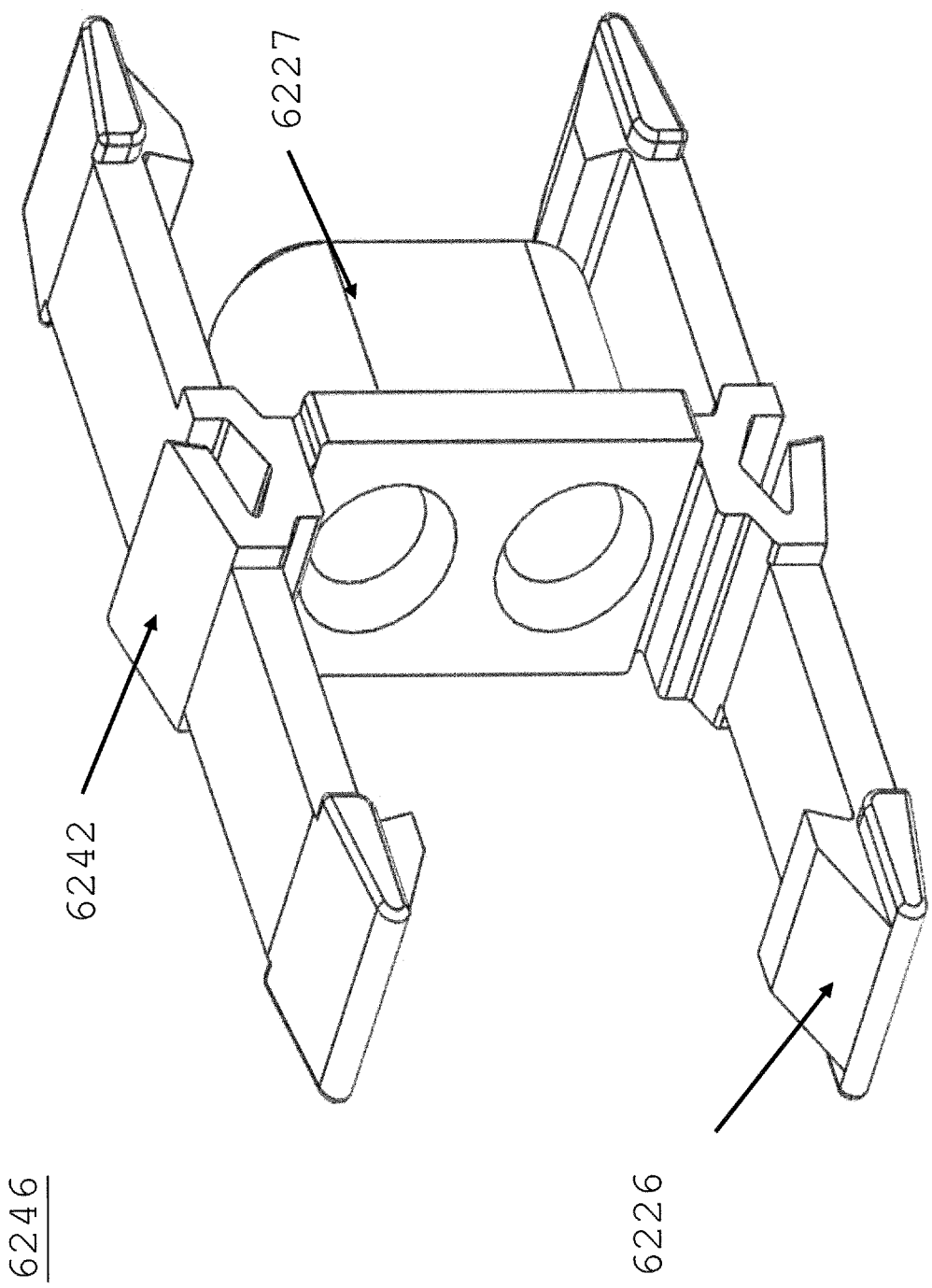
FIG. 13 is a perspective view of another embodiment of an adapter hook and alignment assembly.

Referring to FIG. 12, front body 6102 has two cutouts 6119 and 6121 and an extended middle wall 6110. Cutout 6121 engages the outer housing hooks (not shown) that replaces flex key 3703 to secure the outer housing to the front body. Cutout 6121 secures the polarity change key 5310. Cutout 6119 secures back post 2106 to front body 6102 via back post front body hook 2106.1 (refer to FIG. 2). The material is saved at back post 2106 overmolding, by not using the flex key, and this saved material to reinforce the middle wall to better help support the ferrule springs from bending and thus help prevent distorting the ferrules. This reduced material also allowed a reduction in the connector size contribution to a 3.1 mm ferrule to ferrule pitch as shown in FIG. 12. This distortion can increase insertion loss. Connector recess 6111 is located at the proximal end of front body 6102, and the recess engages and locks with connector hook 5525. Referring to FIG. 13, adapter hook 6246 added chamfers (6242, 6226) to adapter (connector) hook surfaces to improve installation of the connector into the adapter when connector ramps 5512 engage adapter (connector) hook) 5525 Refer to FIG. 5). Adapter hook assembly has an alignment sleeve holder 6227 that accepts one or more ferrules from the micro connector, and aligns the ferrules 9203 with opposing ferrules of a second micro connector (not shown).

FIG. 14 illustrates a group of micro connectors 7500A inserted into an adapter 5700. Adapter 5700 has plural of slots 5700a configured to accept an alignment key 7500A.1 proximal on the alignment and offset key (7500A, 9105.1)

Alignment key, and alignment and offset key is defined as a protrusion adjacent to a side of the connector housing.

FIG. 15 depicts alignment and offset key 7500B with the group of micro connectors 7500A of FIG. 14. Alignment/offset key 7500B adds stability and reduces misalignment during insertion when key 7500B acts as a support between connectors as shown. Key 7500B also helps determine polarity of the micro connector, as described herein.

Figure 16:
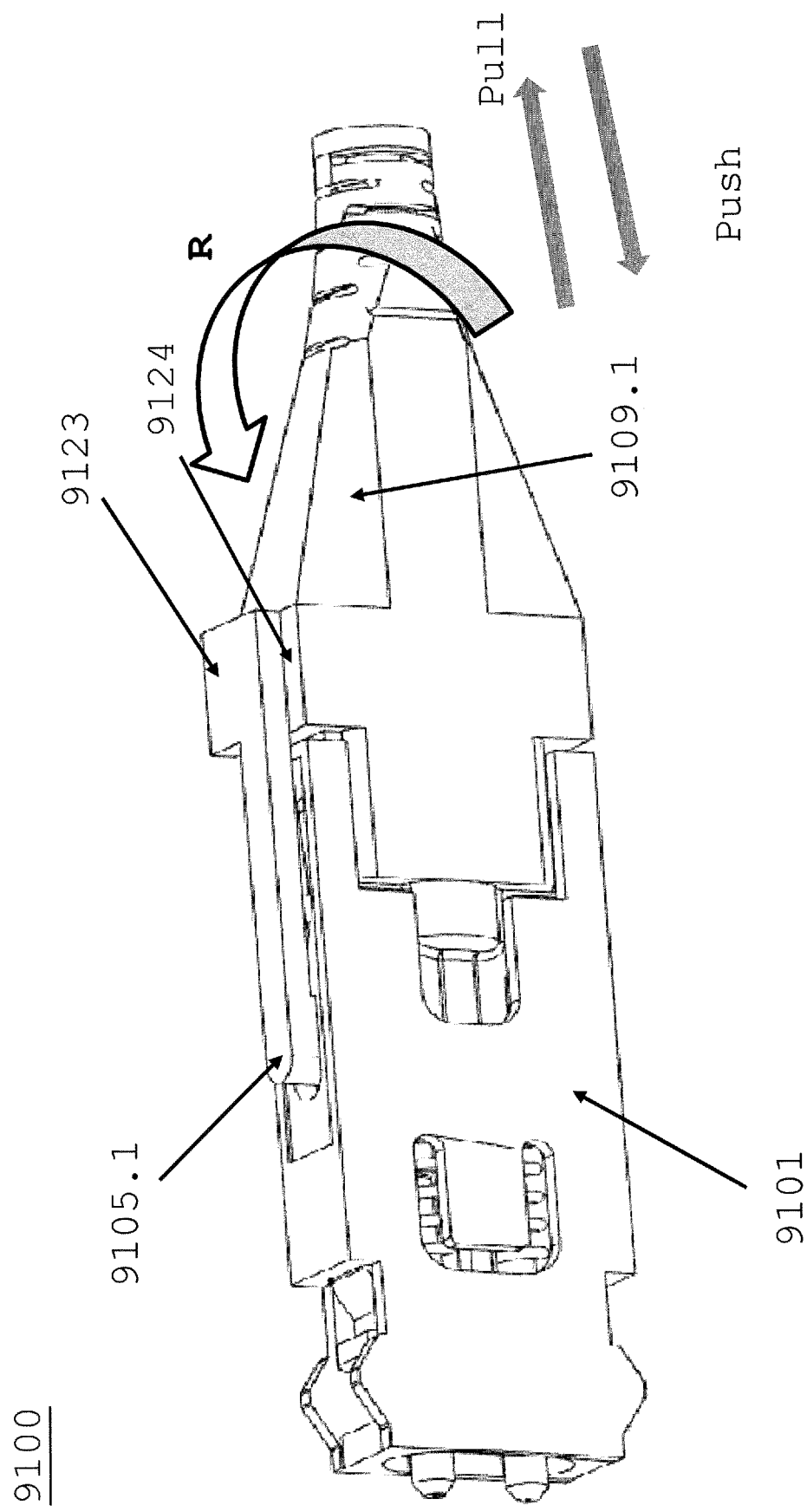
FIG. 16 is a perspective view of a micro connector with multi-purpose push/pull—rotatable boot (FIG. 17) for insert/removal of connector from adapter and for polarity change.
Figure 17:
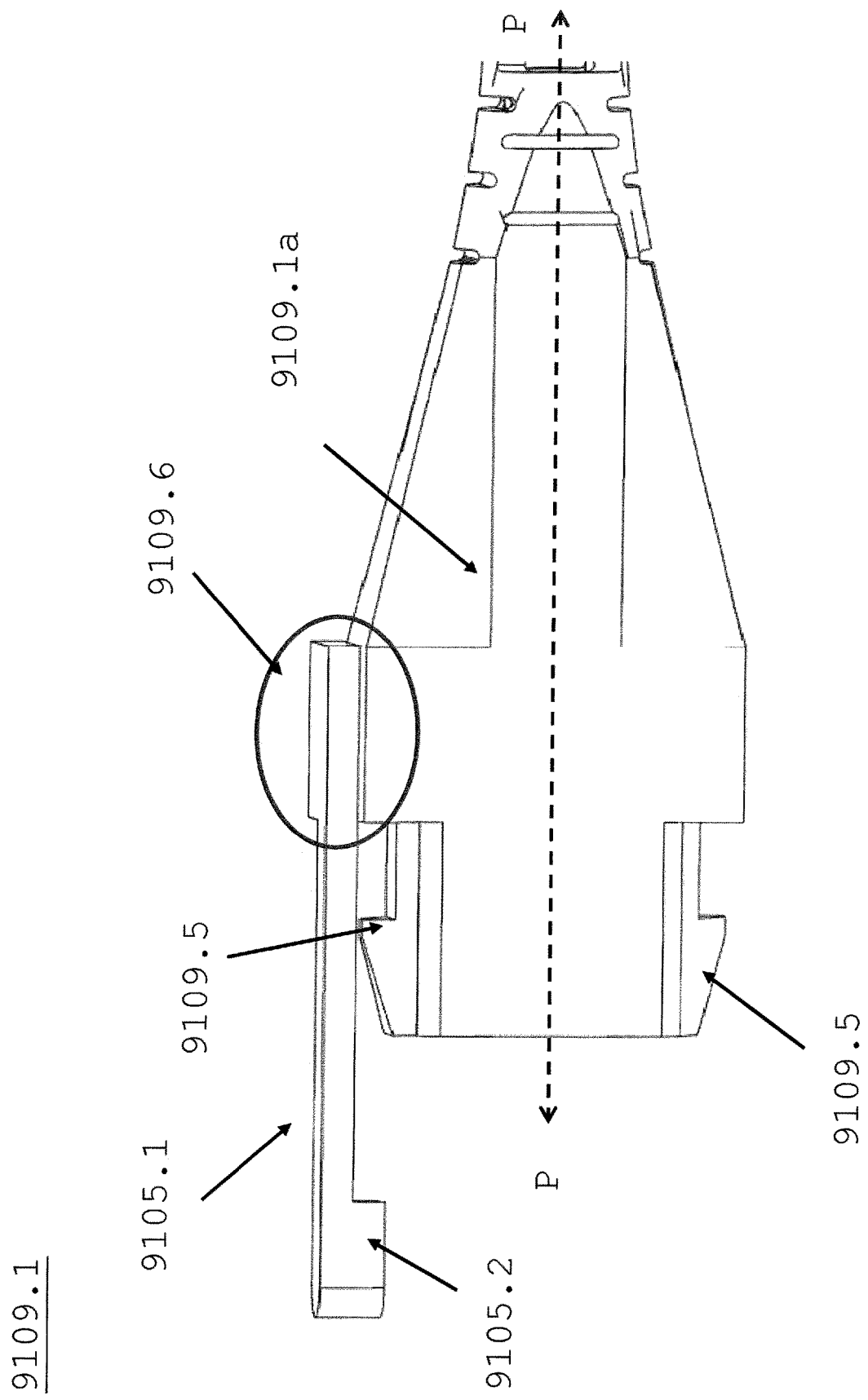
FIG. 17 is a perspective view of multi-purpose rotatable boot assembly with an alignment and offset key releasable attached to the boot assembly.
Figure 18:
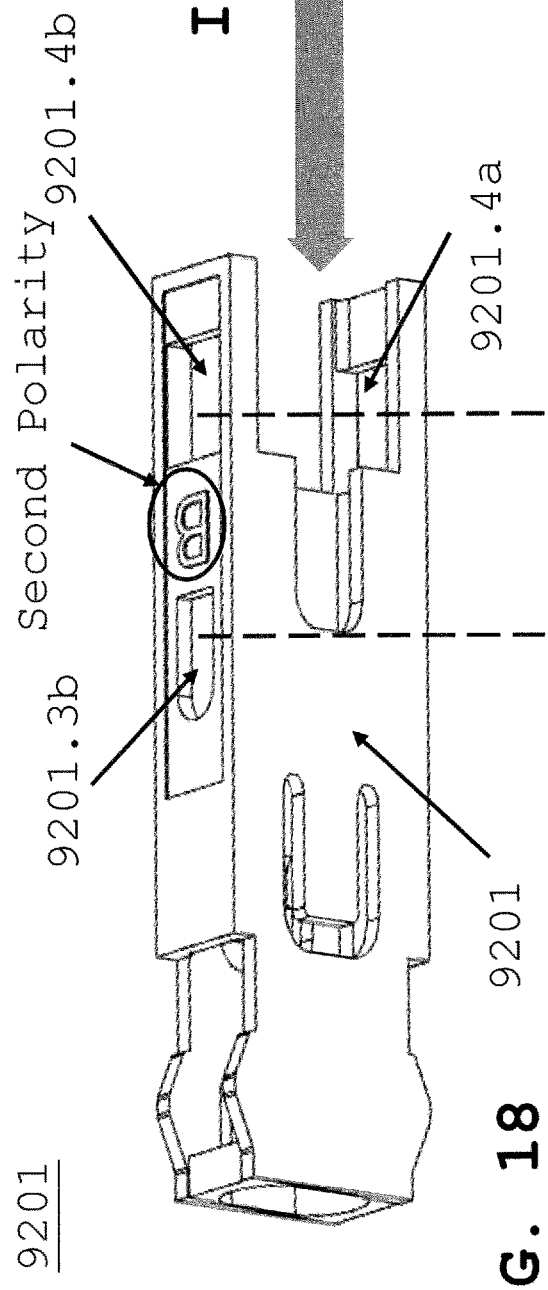
FIG. 18 is a perspective view of an outer housing of the micro connector of FIG. 16.

Referring to FIGS. 16-17, FIG. 16 depicts micro connector 9100 with an alignment and offset key 9105.1 having an offset portion 9123. Offset portion 9123 engages a top surface of a side bar ledge 9124 for aligning connector 9100 into a multi-receptacle adapter next to another micro connector. Side bar ledge 9124 is located further back or nearer a distal end of a connector (e.g. closer to the cable) where side bar ledge 9124 is part of a multi-purpose rotatable boot 9109.1. Micro connector 9100 outer housing 9101 is secured to boot 9100.1 via boot hooks 9109.5 (FIG. 17) that engages second slot 9201.4a and 9201.4b in connector housing 9201 (as shown in FIG. 18), when in polarity status "B" or status "A", as depicted on outside of micro connector housing. Multi-purpose boot is rotatable in the direction of arrow "R".

Figure 43:
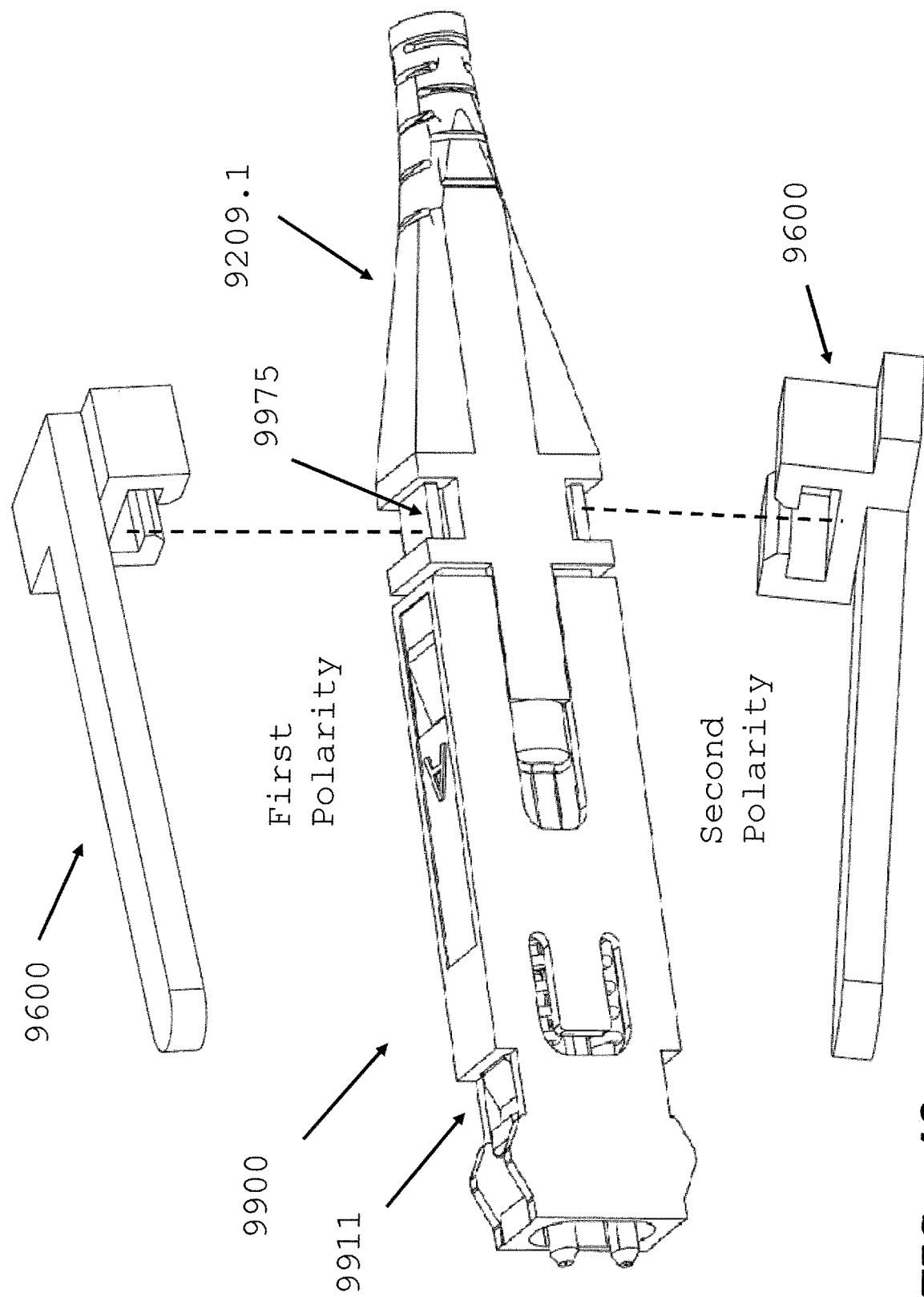
FIG. 43 is an exploded view of another embodiment of a micro connector with a releasably attached clip defining a first and a second polarity.

Referring to FIG. 17, multi-purpose rotatable boot 9109.1 comprises releasably attached alignment and offset key 9105.1, releasable at release point 9109.6, also refer to FIG. 43. Alignment and offset key 2105 may be fixed on connector outer housing, as shown in FIG. 1 or at alignment key 5305 disclosed in FIG. 37. The alignment key may have not offset portion as disclosed in FIG. 1 and FIG. 37, without departing from the scope of the invention, that the boot assembly is rotatable as disclosed in FIGS. 26-27 and FIGS. 25-33 and FIGS. 43-45. It is the key protruding from the connector housing that is determines polarity upon rotation of the boot assembly as disclosed herein. Alignment key (2105, 9405.1, 5305, 9600) or similar structure protruding from the outer connector housing repositioned by the rotating boot assembly and the key interaction with adapter structure that determines polarity as described herein. Referring to FIG. 17, key 9105.1 has a securing protrusion 9105.2 at a proximal end that engages first slot 9201.3b in connector housing 9201 (refer to FIG. 18) to further secure multi-purpose rotatable boot assembly 9109.1 to front body 9202 or outer housing 9201. Multi-purpose rotatable boot assembly 9109.1 comprises a body 9109.1a with a passageway along line P-P for passing a fiber optic cable (refer to FIG. 26 and FIG. 27) to the ferrules to complete the signal path.

Referring to FIG. 18, outer housing 9201 is shown in a Second Polarity orientation "B" comprising corresponding first slot 9201.3b and second slot 9201.4b. Multi-purpose rotatable boot assembly 9209.1 (FIG. 19) is inserted at a distal end of connector housing 9201 shown in the direction of arrow "I". Second slot 9201.4a corresponds to polarity position "A".

Figure 19:
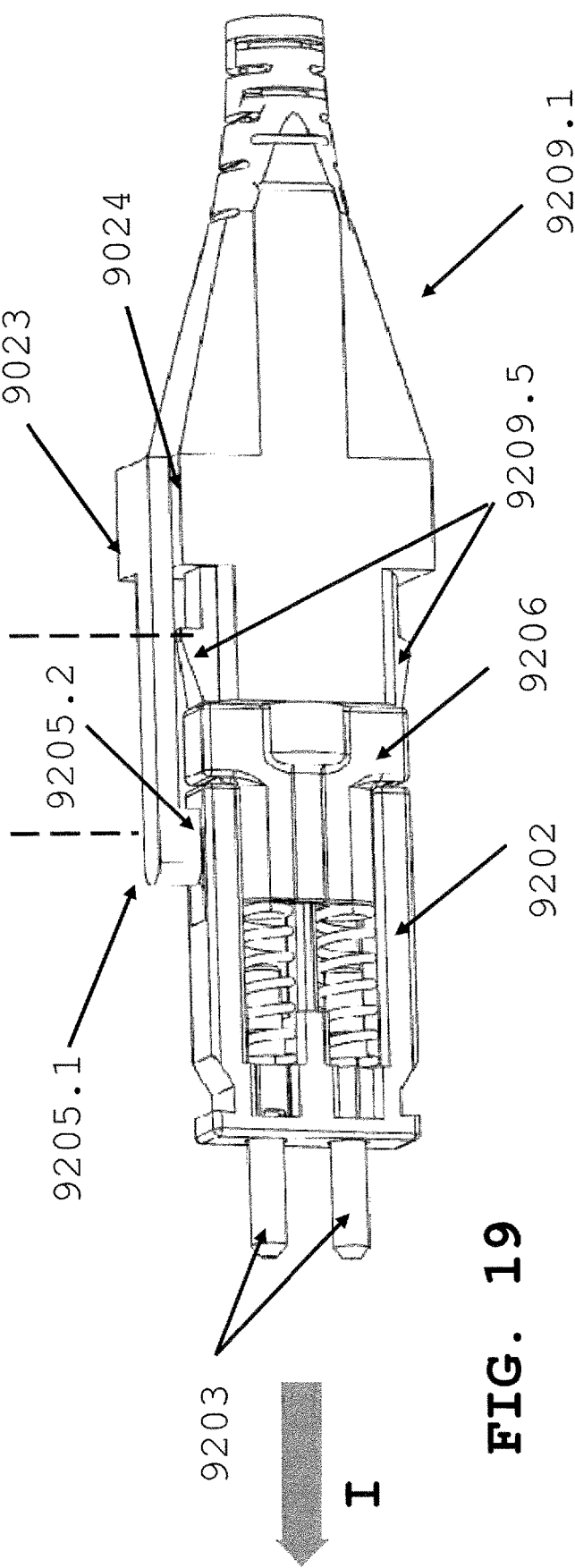
FIG. 19 is a perspective view of front body and boot removed from FIG. 18 outer housing.

Referring to FIG. 19, multi-purpose rotatable boot assembly 9209.1 comprises alignment and offset key 9205.1, as described herein boot hook 9209.5, side bar ledge 9024 that is configured (as described herein) to engage back body 9206, front body 9202 and plural of ferrules 9203. Side bar ledge 9024 accepts offset key 9023 of a second connector when two connectors are inserted into an adapter. This allows connectors to be inserted side by side into an adapter more easily, without jamming. The proximal end (or ferrules 9203 end) of assembly 9209.1 is inserted into a distal end of the outer housing 9201 (FIG. 18) in the direction of arrow "I". Upon insertion, the outer housing 9201 engages with multi-purpose rotatable boot assembly 9209.1 as shown by the dotted lines between first slot 9201.3b and second slot 9201.4b, engaging securing protrusion 9205.2 on alignment and offset key 9205.1 and boot wing 9209.5. The wing and securing protrusion are received second slot and first slot described in FIG. 18 outer housing.

Referring to FIG. 20, front body 9302 and boot assembly 9309.1 are assembled in micro connector housing 9301 with alignment and offset key 9305.1 in a first polarity position.

Referring to FIG. 21, multi-purpose rotatable boot assembly 9309.1 is rotated in direction "R" to convert from a first polarity "A" (refer to FIG. 20) to Second Polarity "B" (refer to FIG. 23), with alignment and offset key 9305.1 180 degrees or opposite the first polarity position as depicted in FIG. 20, to Second Polarity position "B". Boot rotation key 9305.1 may be sized as disclosed in FIG. 1. Boot hook 9209.5 further comprises chamfer 9309.2. Chamfer 9309.2 engages wall 9301.5 of connector outer housing and chamfer 9309.2 lifts boot hook 9209.5 out of a distal end of connector housing 9301 and is freed from second slot 9201.4b, and securing protrusion 9105.2 (refer to FIG. 17 and shown in FIG. 20) lifts out of first slot 9201.3b thereby allowing the boot assembly to rotate as shown in the direction "R", FIG. 21. Chamfer 9309.2 may engage wall 9301.5 using an angle or chamfer cut opposite current chamfer 9309.2 to allow for rotation in the opposite direction of FIG. 21. Rotation of boot assembly 9309.1 changes connector 9100 from a first polarity "A", as depicted in FIG. 20, to Second Polarity "B", as depicted in FIG. 19 (without connector housing) and FIG. 32. Boot assembly may be rotated in a clockwise direction, without departing from the scope of the invention.

Figures 22, 23:
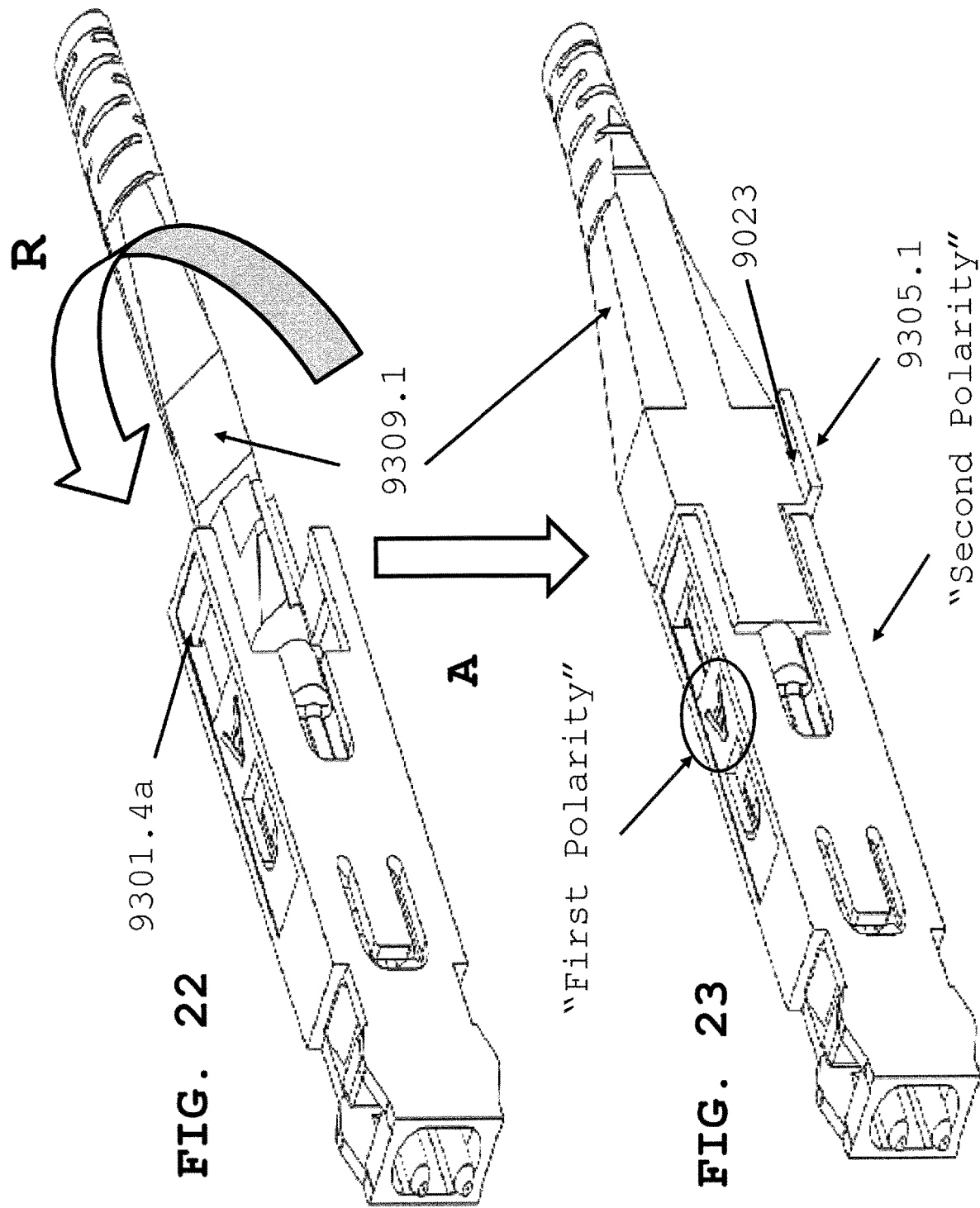
FIG. 22 depicts micro connector of FIG. 20 being rotated further to the second polarity.
FIG. 23 depicts micro connector of FIG. 20 in the second polarity.

Referring to FIG. 22, further rotation of boot assembly 9309.1 results in a change to a second polarity as shown in FIG. 23, with alignment and offset key secured within polarity "B" first slot 9201.3b.

Referring to FIG. 23, side bar ledge 9023 (as well as alignment key 9305.1) is in Second Polarity position or "B" polarity, and when the micro connector is inserted into an adapter (not shown), the micro connector is oriented with key 9305.1 in an opposite position to FIG. 20, so key may be blocked by corresponding adapter structure (not shown). If micro connector 9100 is blocked by adapter structure this means the micro connector is not in the correct polarity orientation to make a fiber to fiber connection via an adapter to an opposing fiber optic connector or transceiver as is known in the art. After rotation, the ferrules are reversed the top ferrule is now the bottom ferrule, and this results in a second polarity configuration. The second polarity being different from the first polarity, that is, Rx receive signal is now Tx transmit signal path and vice versa. Alignment and offset key 9405.1 has been switch from a First Polarity "A" to Second Polarity "B".

Figure 24:
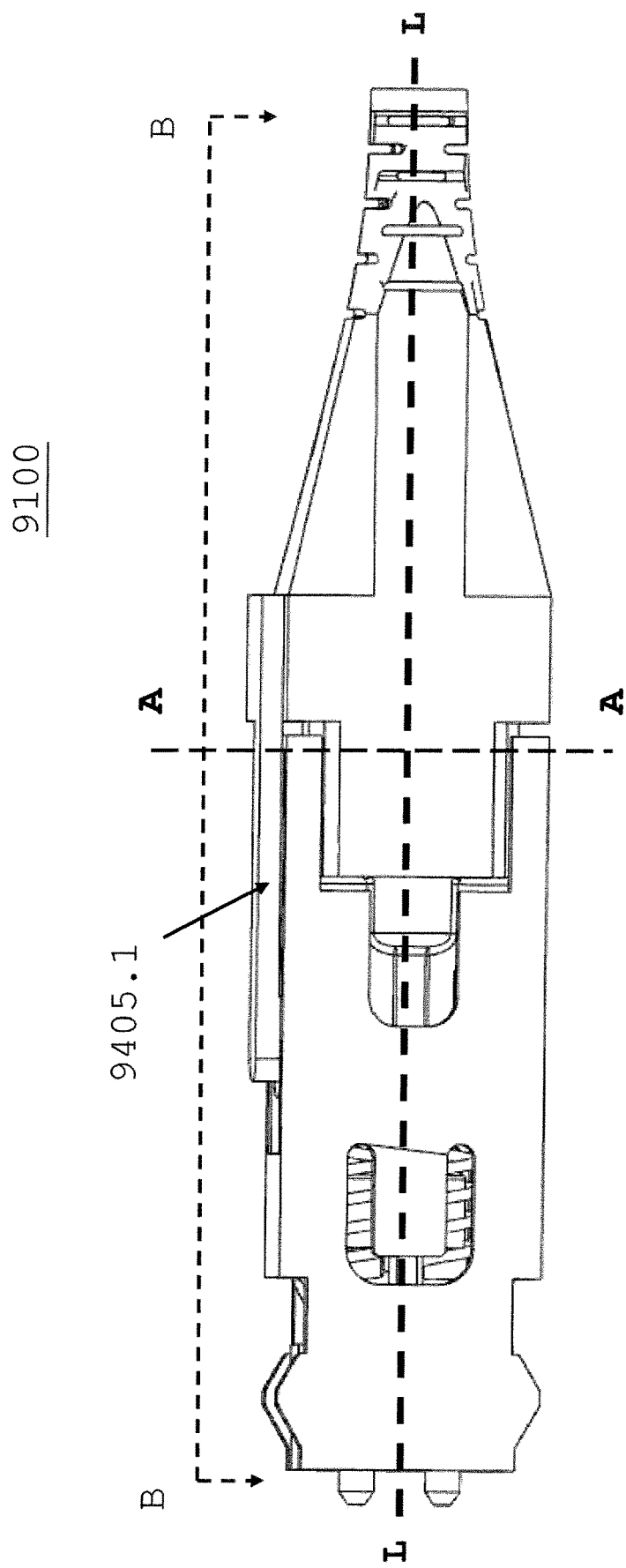
FIG. 24 is side view of micro connector of FIG. 16 with a cross section cut "A-A".

FIG. 24 is the micro connector 9100 with a cross section along "A-A" line as shown in FIGS. 25 through 33 further illustrating polarity change using multi-purpose rotatable boot assembly 9209.1. Longitudinal cross section is provided along line "B-B" in various drawings of this application. "L-L" is the longitudinal axis of the connectors in the present invention.

Figure 25:
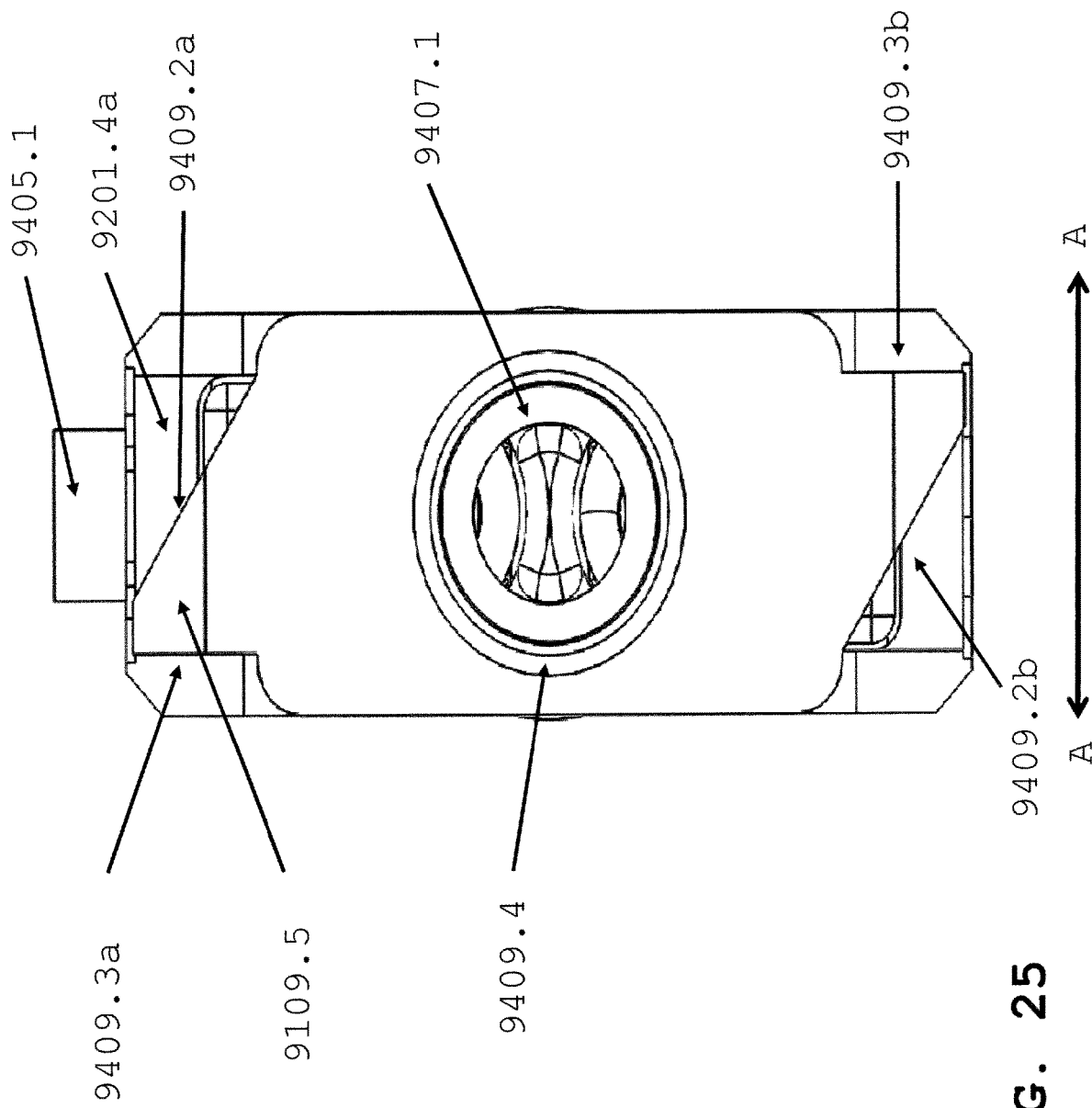
FIG. 25 is a view along cross section cut "A-A" of the micro connector of FIG. 16 in a first polarity position.
Figure 26:
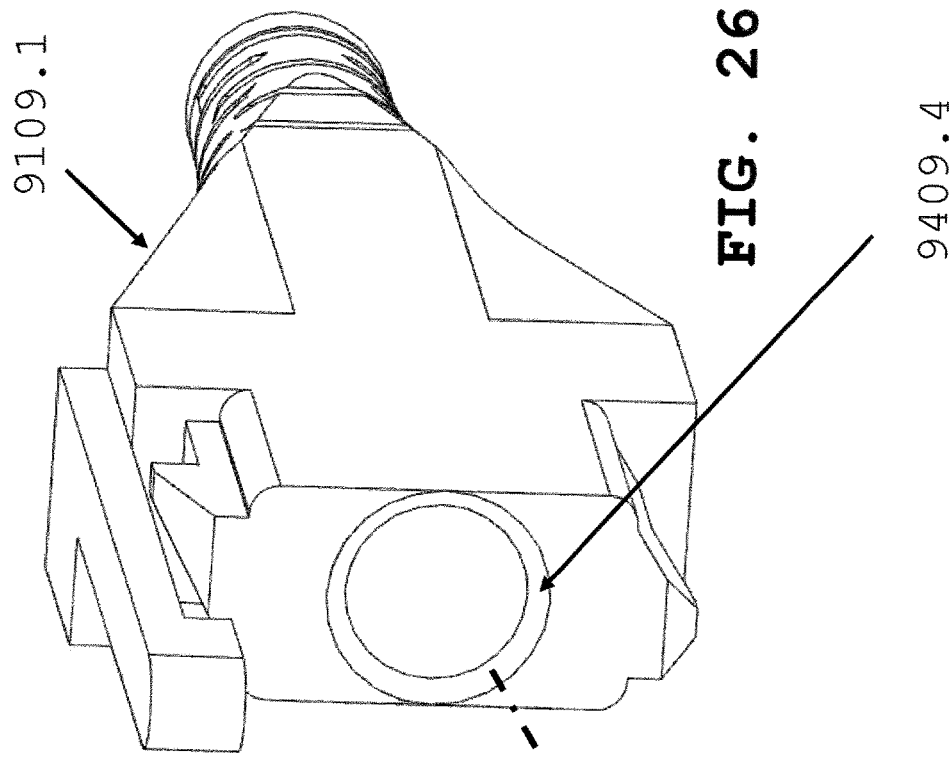
FIG. 26 is an end view of the boot assembly illustrating an opening for fiber optic cabling.
Figure 27:
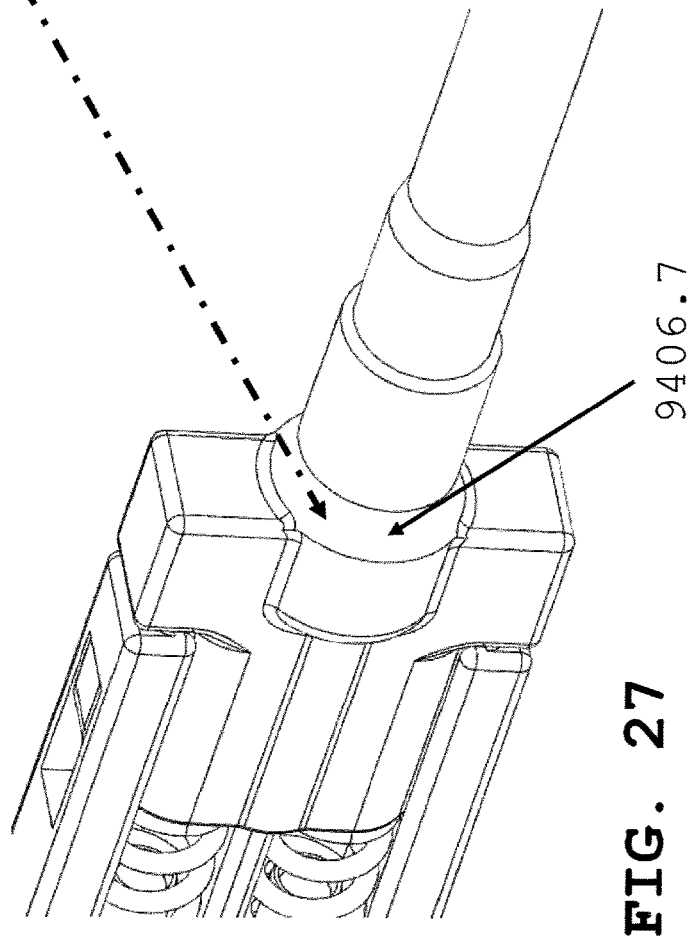
FIG. 27 is a perspective view of end of a back body, with fiber optic cabling.

Referring to FIG. 25, a front view of the cross-section cut "A-A" of the micro connector of FIG. 24 (also FIG. 16) further comprises an opening through which fiber cabling (not shown) travels, and crimp ring surface 9407.1 that is further surrounded by inner round 9409.4. Referring to FIG. 26, inner round 9409.4 engages a back post surface 9406.7 formed as an outer round shown at FIG. 27, as the assembly 9209.1 is rotated. Inner round and outer round form mating surfaces that can freely rotate thereby allowing multi-purpose boot assembly to be rotated about fiber optic connector housing. Referring back to FIG. 25, boot hook 9109.5 further comprises first chamfer 9409.2a and first stopping wall 9409.3a, and second chamfer 9409.2b and second stopping wall 9409.3b, in a first polarity position. Boot hooks 9109.5 rotate between second slot 9201.4a and second slot 9201.4b during polarity change. Second slot 9201.4a corresponds to the connector being in a "A" polarity position. Likewise, second slot 9201.4b corresponds to the connector being in "B" polarity configuration. Securing protrusion 9405.1 resides in first slot 9201.3a for "A" polarity, and then resides in first slot 9201.3b for "B" polarity after boot release 9309.1 rotation.

Figure 28:
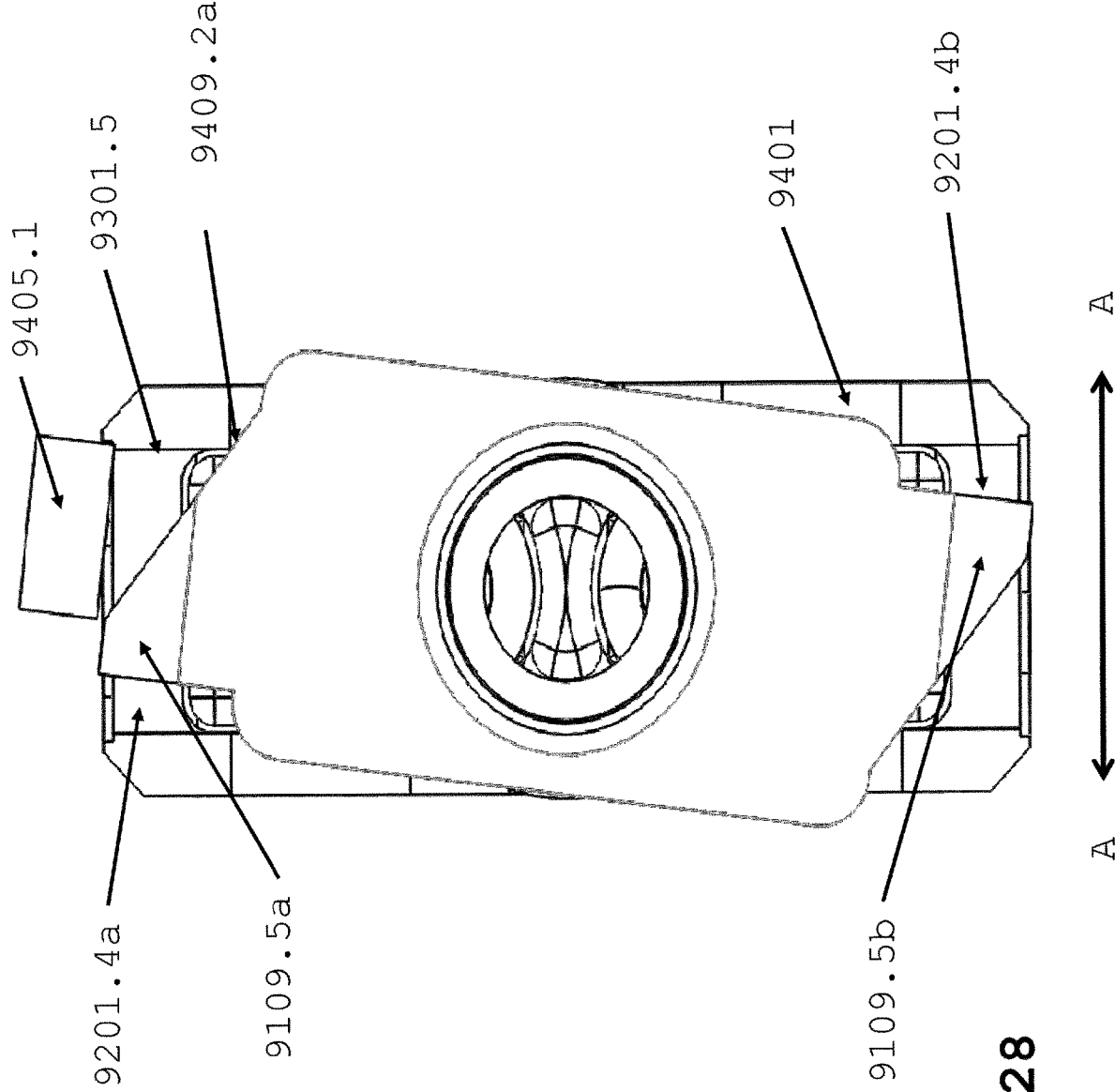
FIG. 28 is perspective view along cross section "A-A" at a start of boot rotation to change a micro connector from a first polarity to a second polarity.

Referring to FIG. 28, rotating of the boot assembly is started and chamfer 9409.2a engages connector housing wall 9301.5 and begins to lift first boot wing 9109.5a out of second slot 9201.4a. Likewise, a second boot wing 9109.5b is rotating out of second slot 9201.4b.

Figure 29:
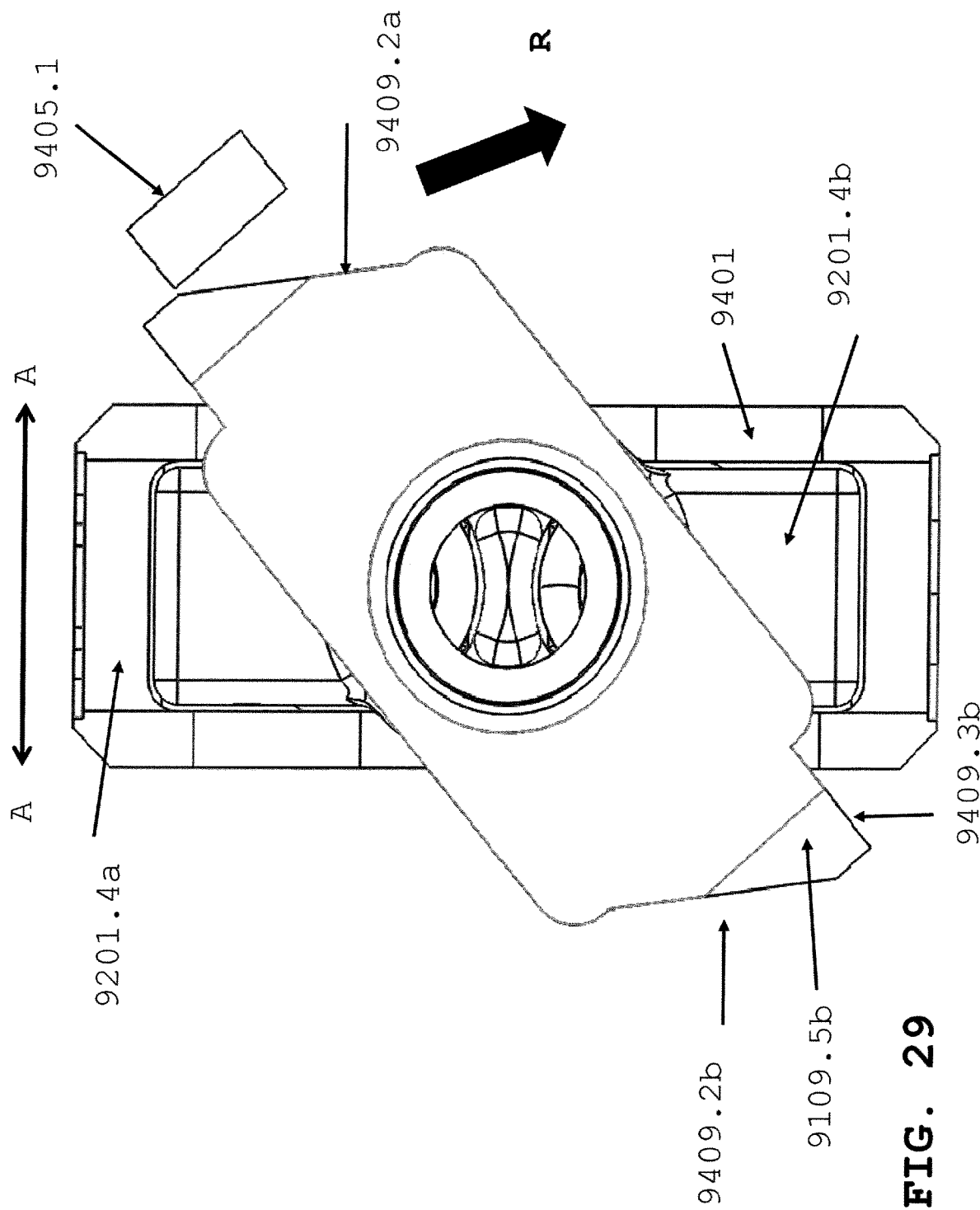
FIG. 29 is perspective view along cross section "A-A" in furtherance of boot rotation to change the micro connector from a first polarity to a second polarity.

Referring to FIG. 29 upon further rotation in direction "R", securing protrusion 9105.2 (refer to FIG. 20) on alignment and offset key 9405.1 is lifted out of first slot 9201.3a (refer to FIG. 20 and FIG. 21), and boot wing 9109.5a is lifted out of second slot 9201.4a at a top surface and upon 180 degree rotation, securing protrusion 9105.2 (refer to FIG. 20) is accepted into first slot 9201.4b at a bottom surface of the outer housing 9401. Boot wing 9109.5b moves out of second slot 9201.4b.

Figure 30:
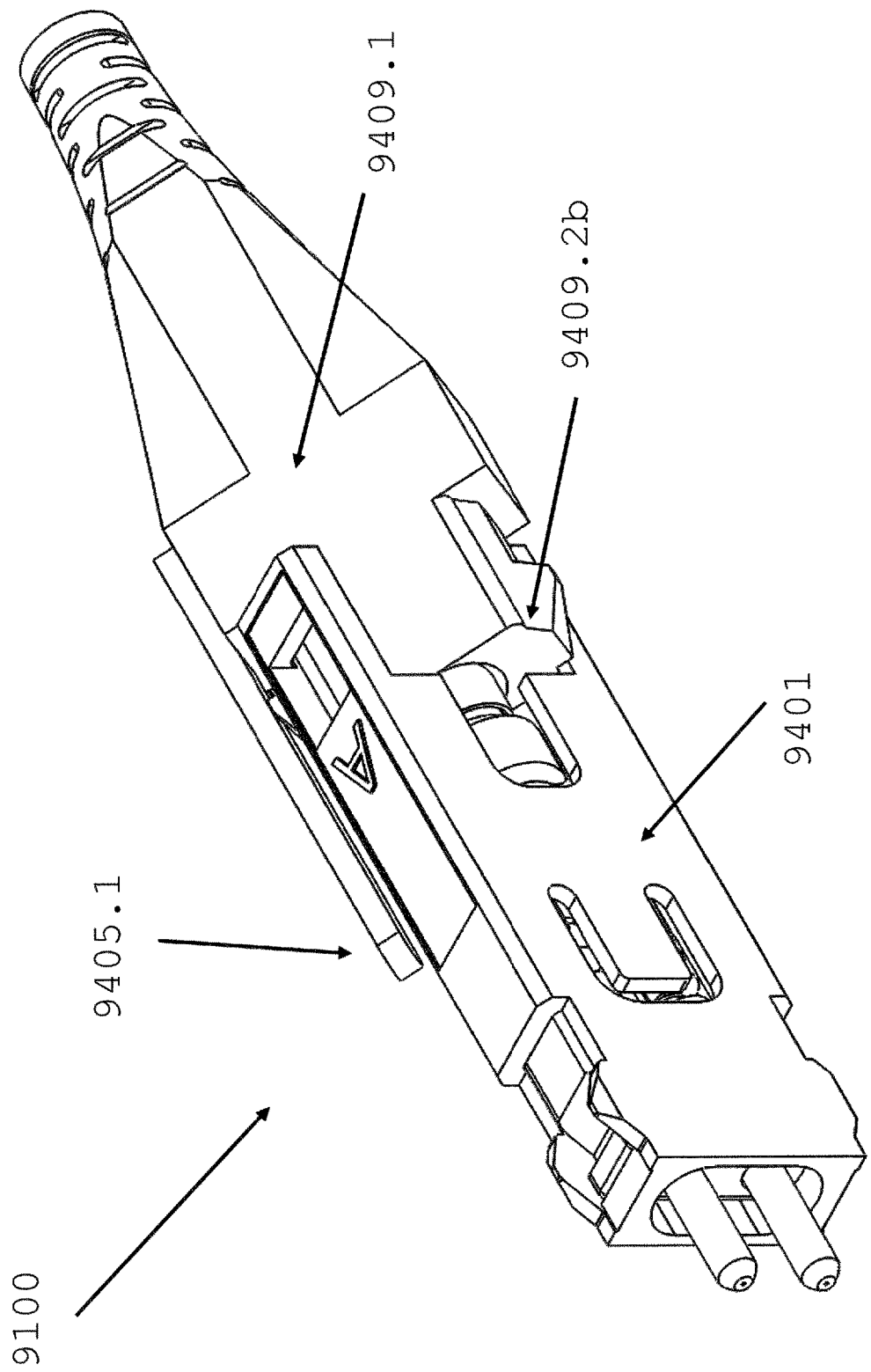
FIG. 30 is a perspective view of the micro connector in furtherance of boot rotation.

Referring to FIG. 30, the rotation of boot assembly 9409.1 is shown as it exits the outer housing 9401 of connector 9100. Chamfer 9409.2b exits first from this view. Alignment and offset key 9405.1 is moving around the outer housing body in a counter-clockwise direction, in this view to a Second Polarity position "B".

Figure 31:
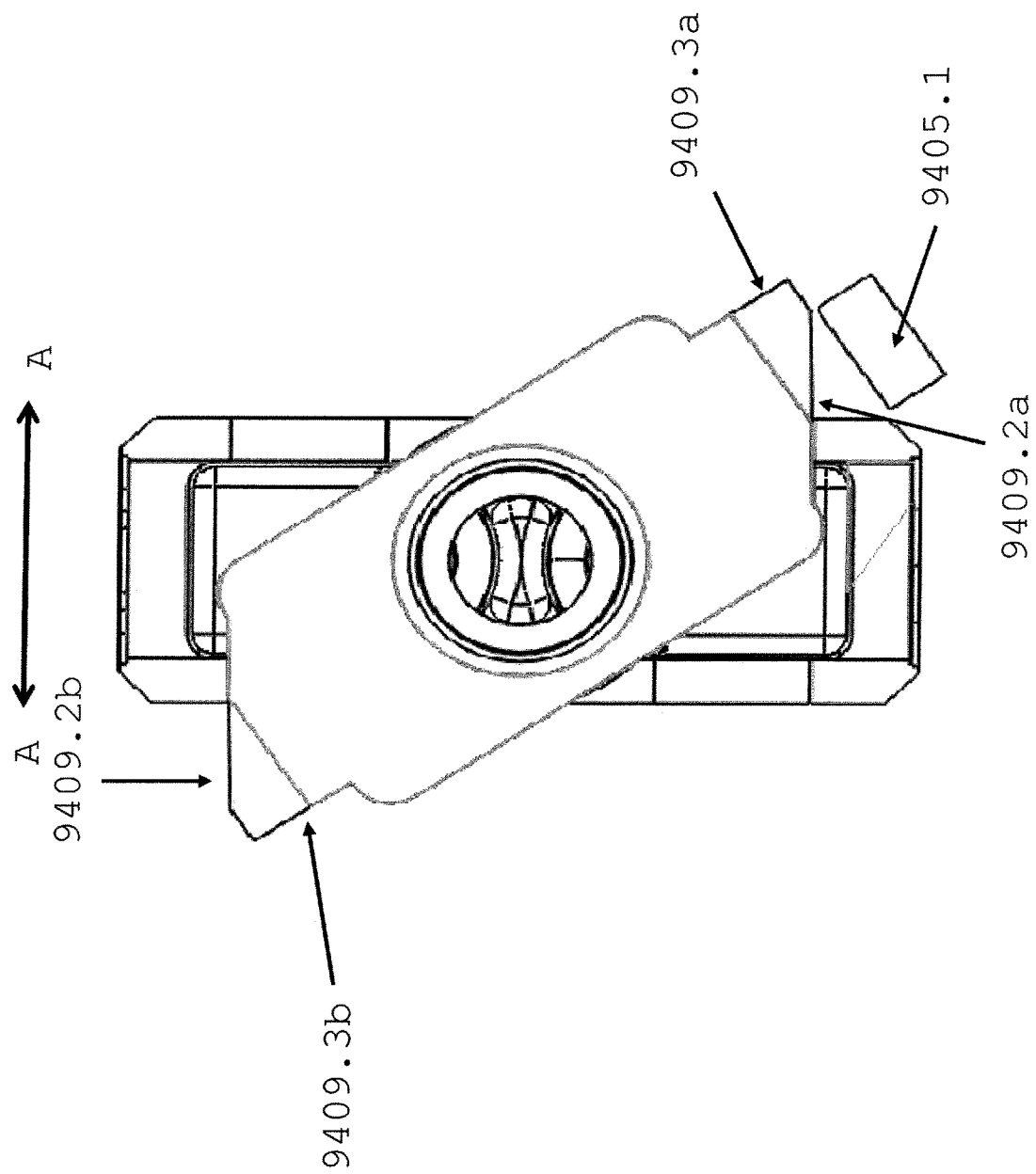
FIG. 31 is a perspective view along cross section "A-A" just prior to completion to a second polarity of the micro connector.
Figure 32:
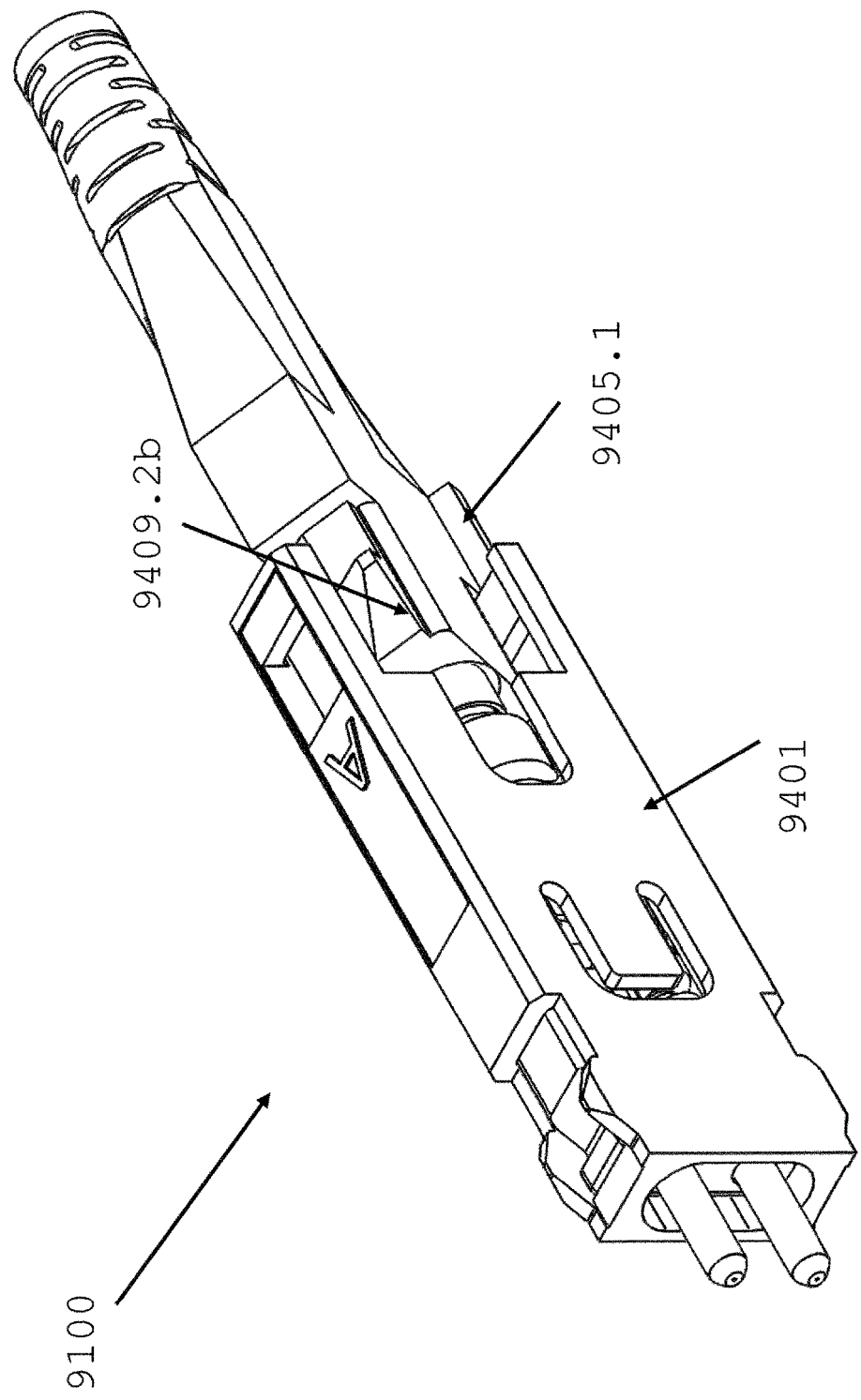
FIG. 32 is a perspective view of the micro connector just prior to completion to a second polarity.
Figure 33:
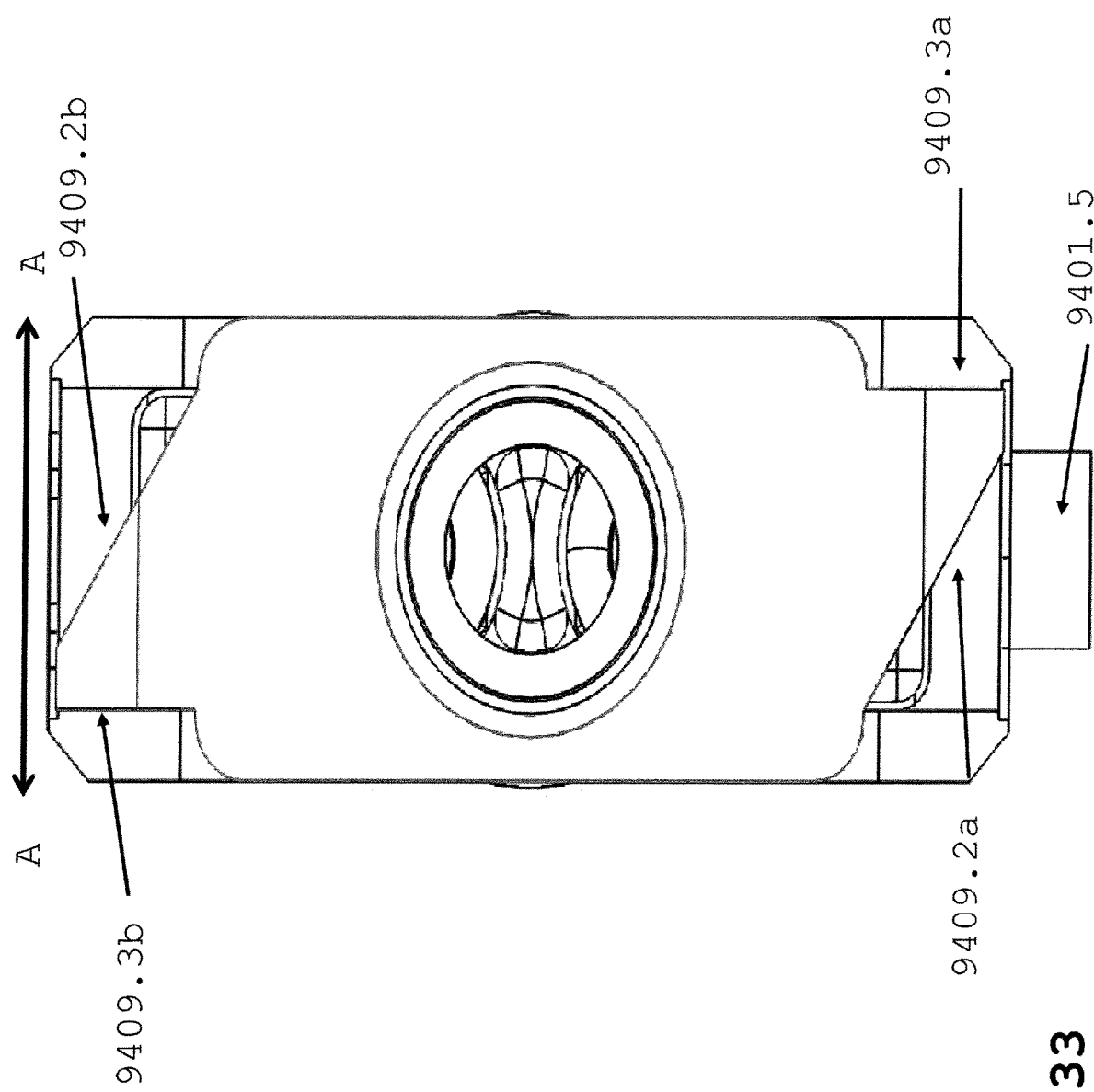
FIG. 33 is a perspective view along cross section "A-A" of micro connector FIG. 16 in a second polarity position.

Referring to FIG. 31, alignment and offset key 9405.1 is almost in a second polarity position as shown, with chamfer 9409.2b in an opposite orientation to itself in FIG. 25. Referring to FIG. 32, connector 9100 shows chamfer 9409.2b in the opposite position to that of FIG. 30, indicating the connector is close to its second polarity configuration with alignment and offset key 9405.1 at bottom surface of outer housing 9401. FIG. 33 depicts connector 9100 along cross section "A-A" in its second polarity position, with chamfer 9409.2b in second slot 9401.4a at the top surface of outer housing 9401. Polarity key 9405.1 is at the bottom surface of outer housing 9401 indicating the connector is in a second polarity configuration.

Figure 34:
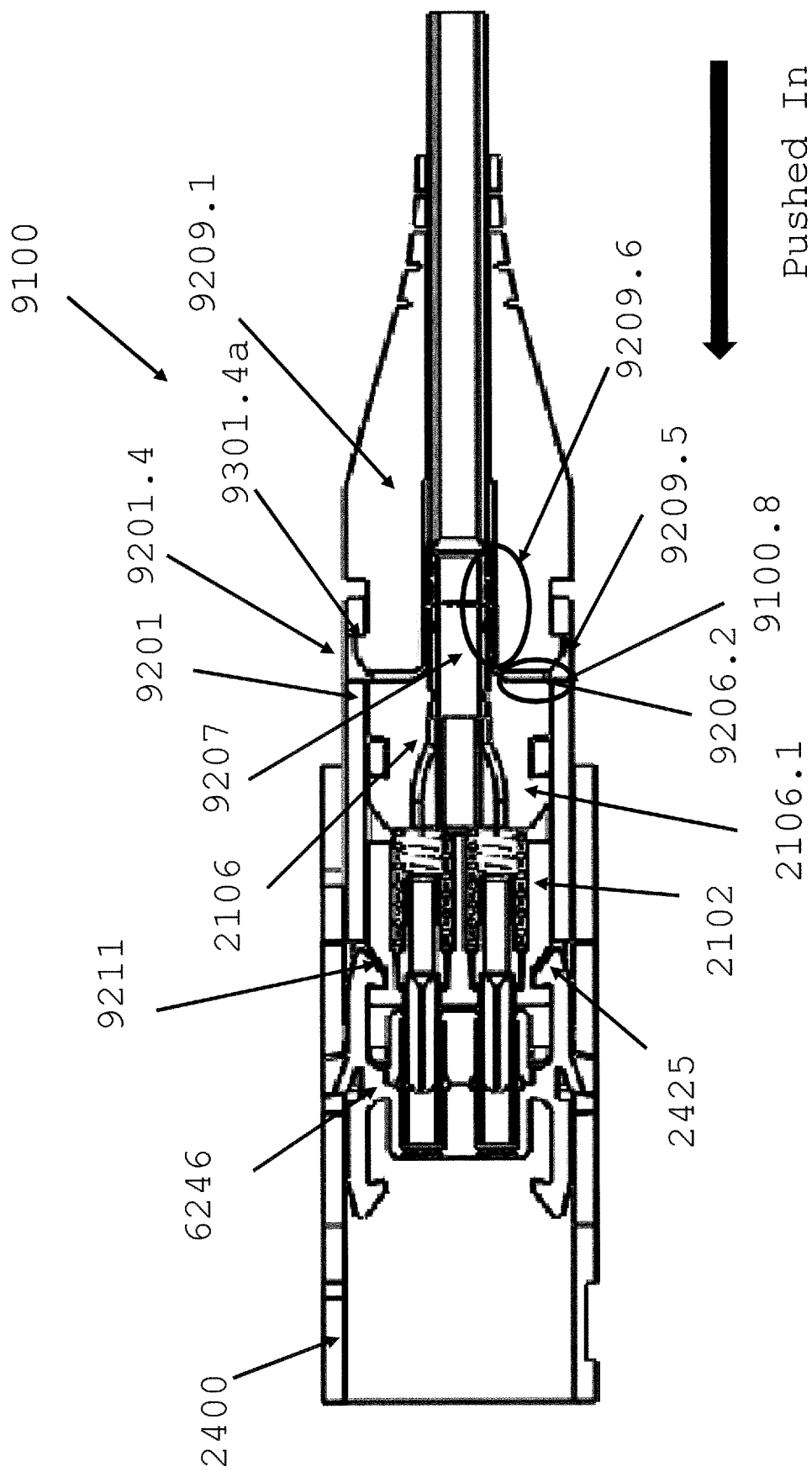

Referring to FIG. 34 a micro connector 9100 is shown along cross section "B-B" (refer to FIG. 24) in a latched position within a receptacle of adapter 2400. During rotation of the multi-purpose rotatable boot assembly 9209.1, boot wing 9209.5 operates as described above in FIGS. 25-33. This is accomplished by gap 9209.6 between boot assembly 9209.1 that allows "free-wheeling" about crimp ring 9207 as inner round 9409.4 engages back post face surface 9406.7 as described in FIGS. 26-27. Rotating boot assembly while connector is in a latched position within adapter, boot assembly wing 9209.5 facing surface is in contact with facing surface 9206.2 of back post 2106, as shown at interface 9100.8. Still referring to FIG. 34, boot wing 9209.5 face engages and releaseably locks with corresponding surface 9301.4a of second slot 9201.4 of outer housing 9201, FIG. 18 and FIG. 21. Micro connector 9100 is latched and unlatched in an adapter 2400 receptacle using push/pull boot assembly or push/pull key as described in FIGS. 9-11, or FIGS. 34-36, or FIGS. 37-42. Adapter hook 2425 is seated in connector recess 9211 located in front body 9202. In this position, boot assembly 9209.1 is up against back body 2106 as shown at interface 9100.8, as shown by direction of arrow "Pushed In".

Figure 35:
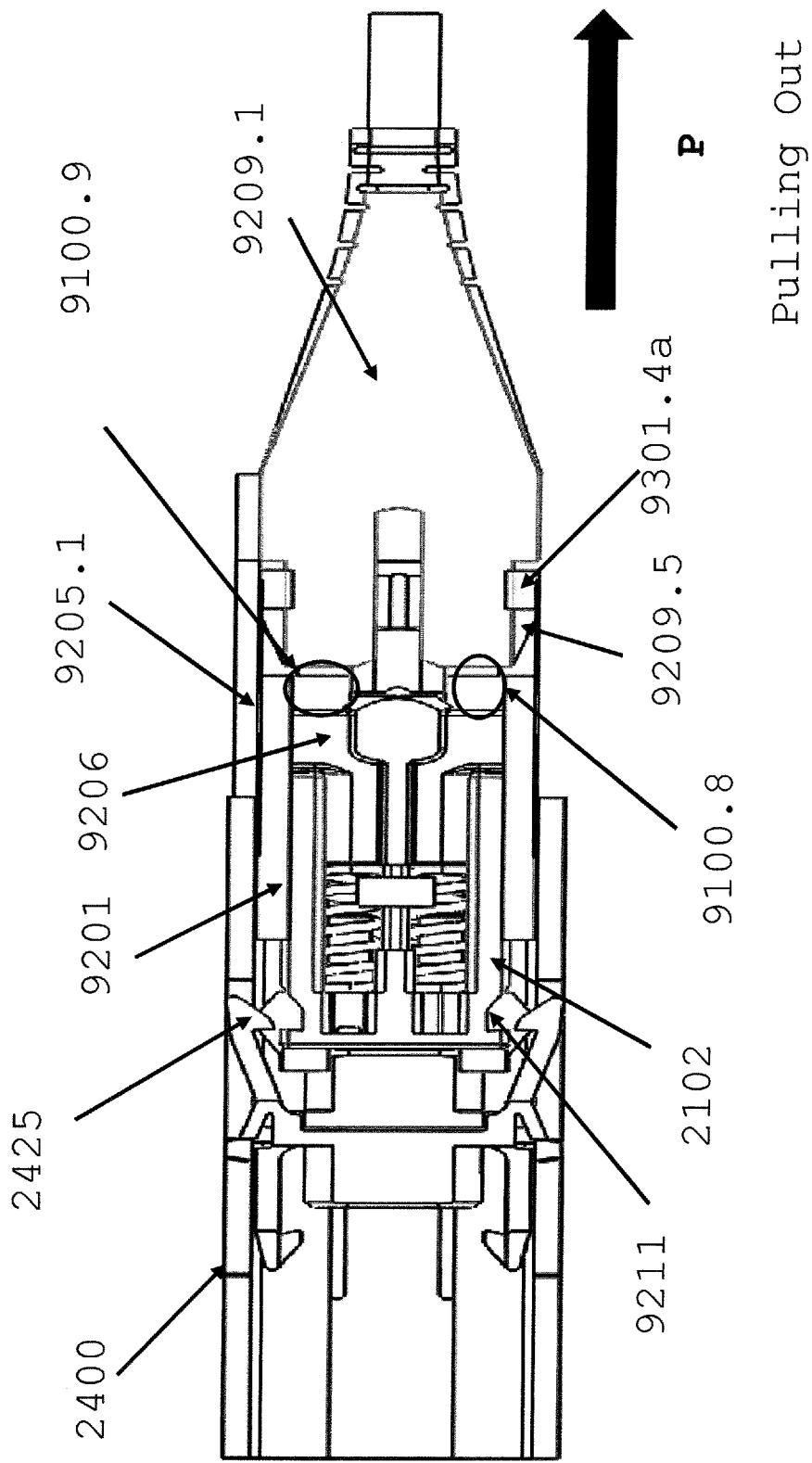
FIG. 35 is a perspective view of FIG. 34 as multi-purpose rotatable boot assembly is partially pulled in direction "P".

Referring to FIG. 35, boot assembly 9209.1 is being pulled rearward in the direction of "P". Boot assembly 9209.1 is pulled a release distance "d" to interface 9100.8, 9100.9 to unlatch connector from adapter interface. At the same time, adapter hook 2425 is being lifted out connector recess 9211 as micro connector 9100 is removed from adapter 2400 receptacle. Boot assembly 9209.1 moves a distance "d" because boot wing 9209.5 engages outer housing face 9301.4a, and pulls outer housing 9201 rearward. Outer housing 9201 is pulled rearward connector 9100 is released from this the amount of separation between the distal end of the back body and proximal end of boot assembly 9209.1. This distance matches channel distance, FIG. 36, 9100.9a, 9100.8a in which boot hooks slide upon pulling connector from adapter using rotatable boot assembly. Hooks 2425 lift out of recess 9211 located at a proximal end of front body 2102, when boot assembly 9209.1 is pulled rearward at least this distance.

Figure 36:
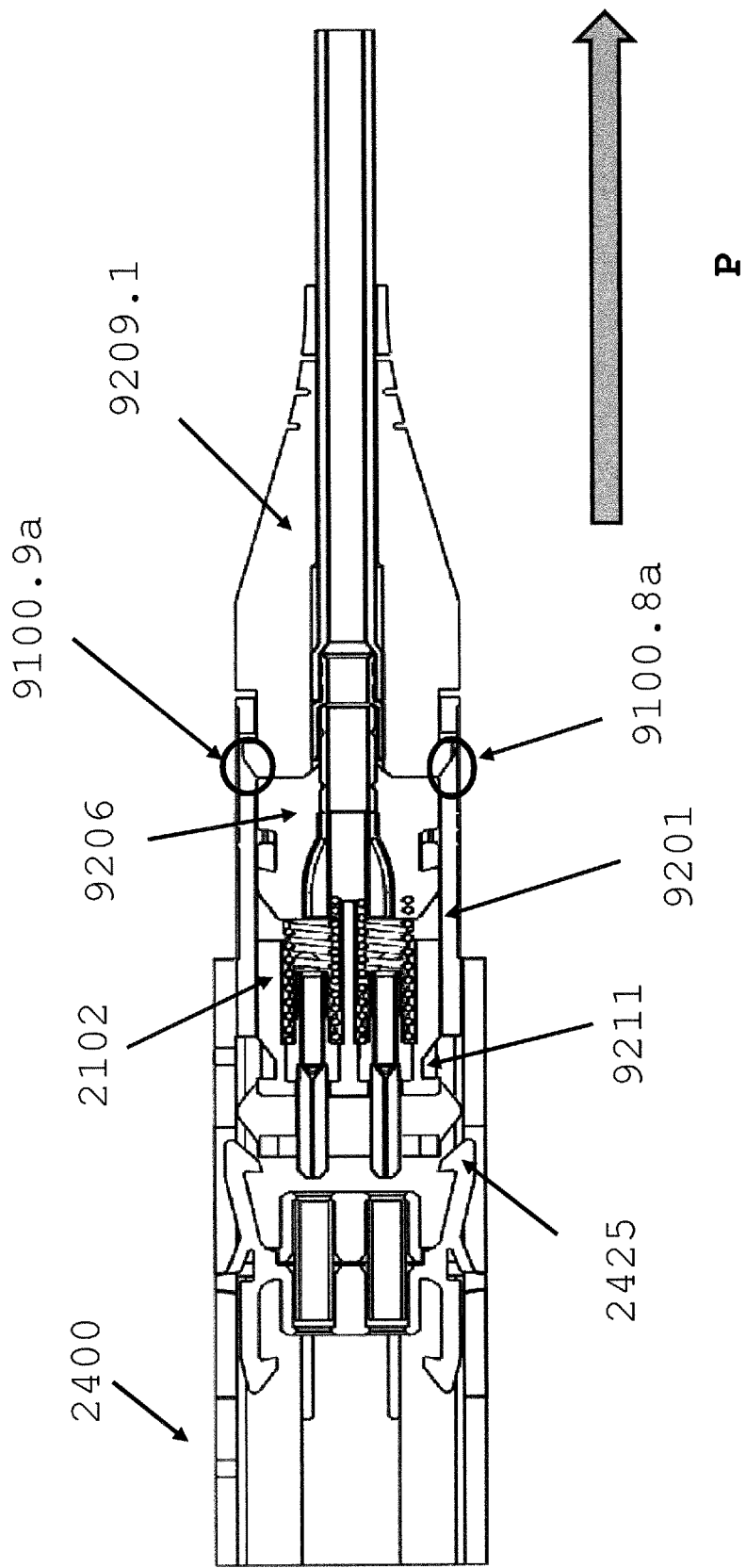
FIG. 36 is a perspective view of FIG. 34 as multi-purpose rotatable boot assembly (FIG. 17) is release from adapter hook but still under influence of pulling force "P".

Referring to FIG. 36, once boot assembly 9209.1 is fully pulled in direction of "P", connector 9100 is released from within adapter 2400. Adapter hook 2425 is completely out of connector recess 9211, and maximum pulling distance. Once the pull force, "P", is release from boot 9209.1, interface distance 9100.8 returns to that of FIG. 34, upon release of pull force "P", on boot assembly 9209.1.

Figure 37:
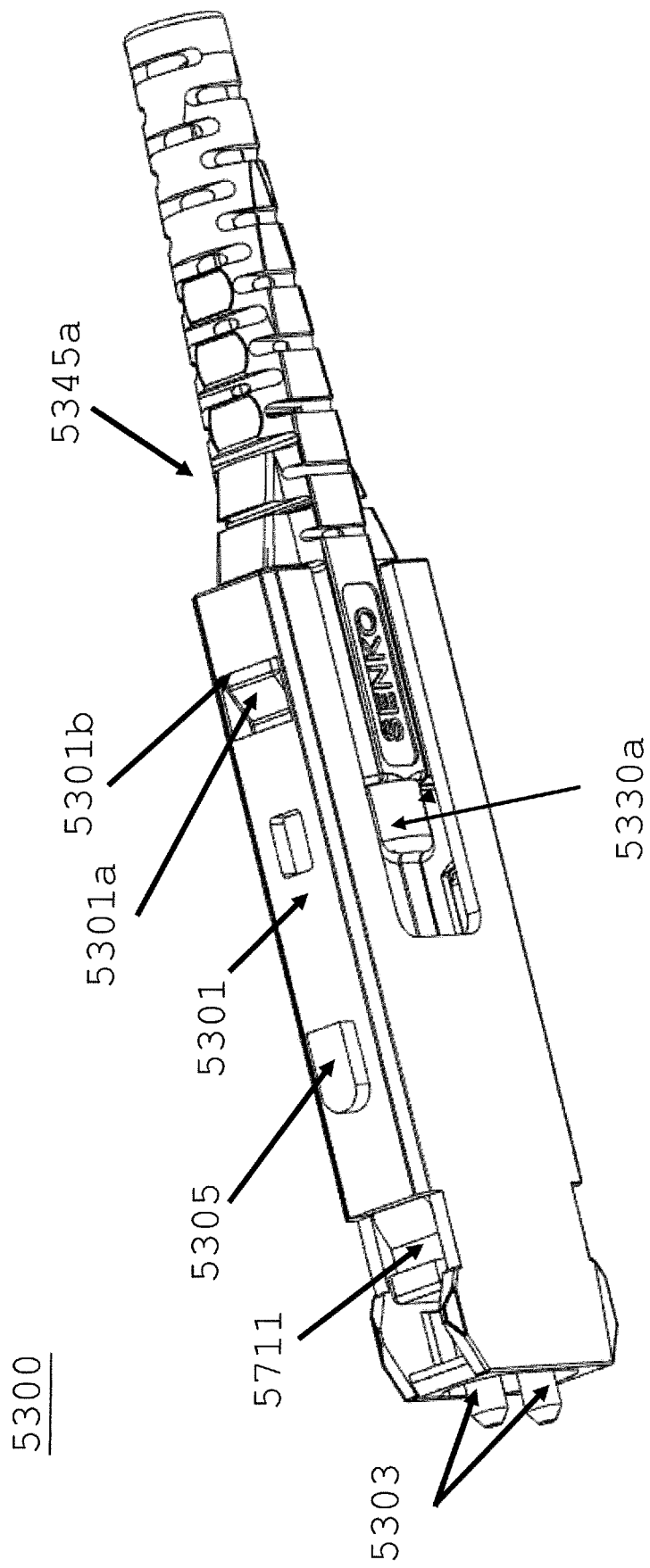
FIG. 37 is perspective view of a micro connector with another push/pull release embodiment incorporated therein.
Figure 41:
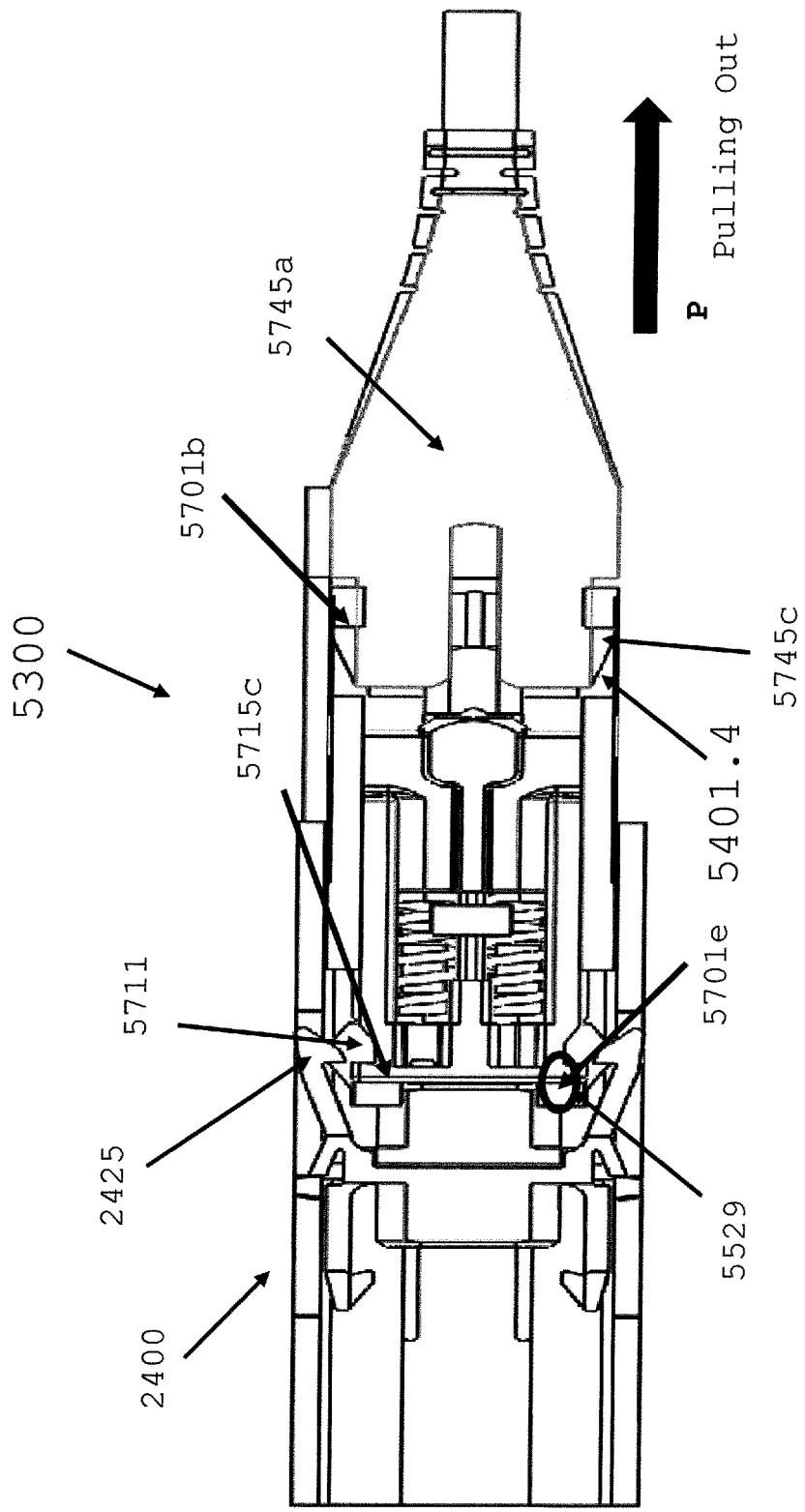
FIG. 41 is a cross-section view of connector of FIG. 37 partial removed using push/pull release boot according to the present invention.

FIG. 37 depicts connector 5300 with push/pull boot assembly 5345a at its distal end receiving a fiber cable with a plural of fiber strands therein, and a proximal end configured to connect and secure to back body assembly 5330a secured with outer housing 5301. Outer housing 5301 has alignment key 5305, further has opening 5301a with stop face 5301b that boot wings (5445b, 5445c) (refer to FIG. 38) engage when boot assembly 5345a is pulled in a distal direction fully to release connector 5300 from a receptacle as shown in FIG. 41, when hook 5425 is removed from recess 5711. Ferrules 5303 provide the Tx, Rx information light signals.

Figure 38:
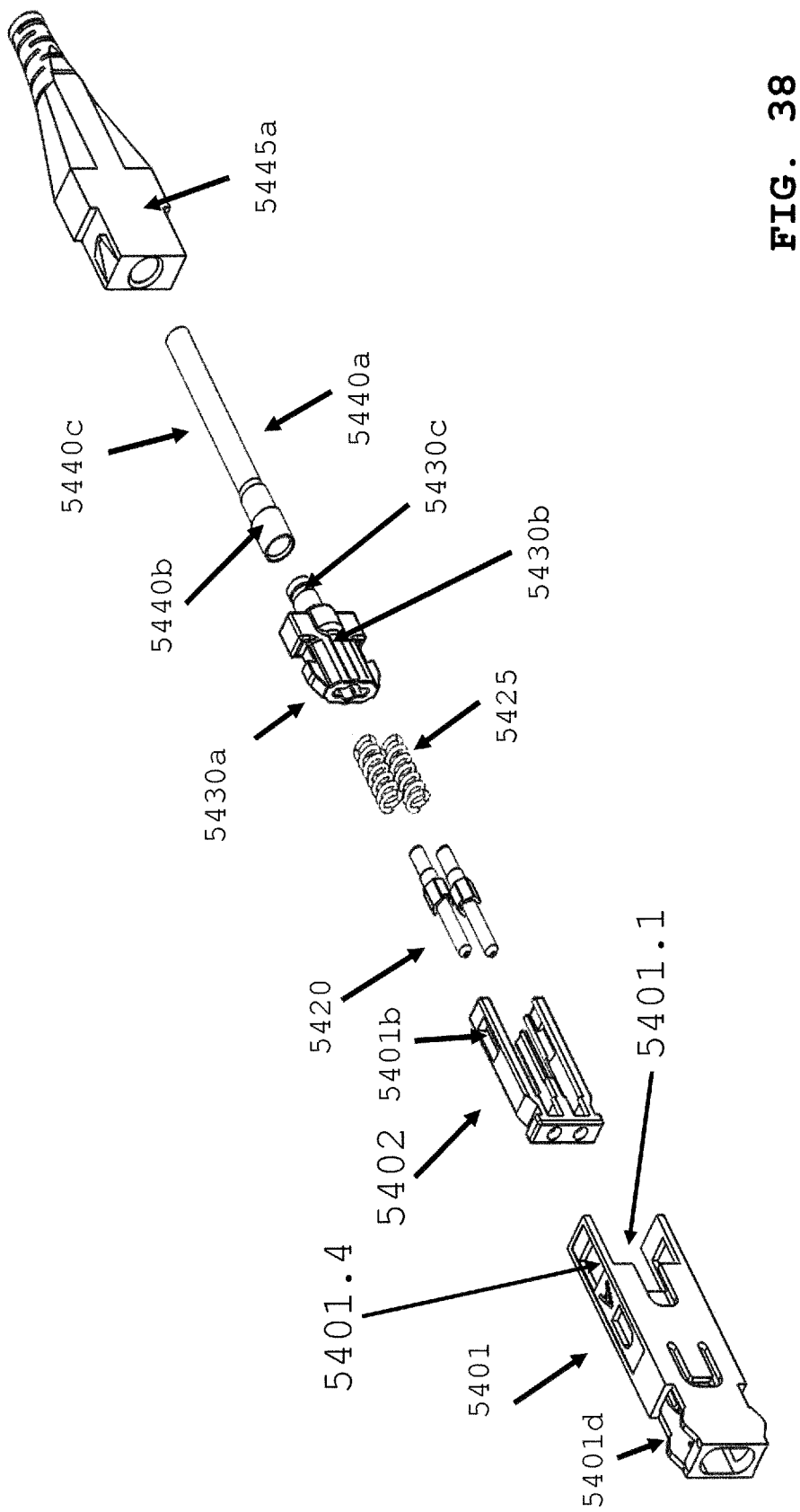
FIG. 38 is an exploded view of FIG. 37 connector.

FIG. 38 depicts an exploded view of connector 5300 of FIG. 37. Boot assembly 5445a accepts crimp ring assembly 5440a having protective tube 5440c covering fiber strands and crimp ring 5440b secured to back post 5430c of back body assembly 5430a including back body 5430b. A pair of springs 5425 are placed over a corresponding ferrule assembly 5420 comprising a ferrule and ferrule flange. The ferrule assembly and springs are held within front body 5402 by back body assembly 5430a, as described for connector 2100. Front body 5402 is inserted into distal opening 5401.1 of outer housing 5401 with boot assembly wing 5430a secured within a distal opening 5415b of front body and wing is secured through opening 5401.4 of outer housing securing outer housing, front body and back body together when assembled with push/pull boot, as depicted in FIG. 37.

Figure 39:
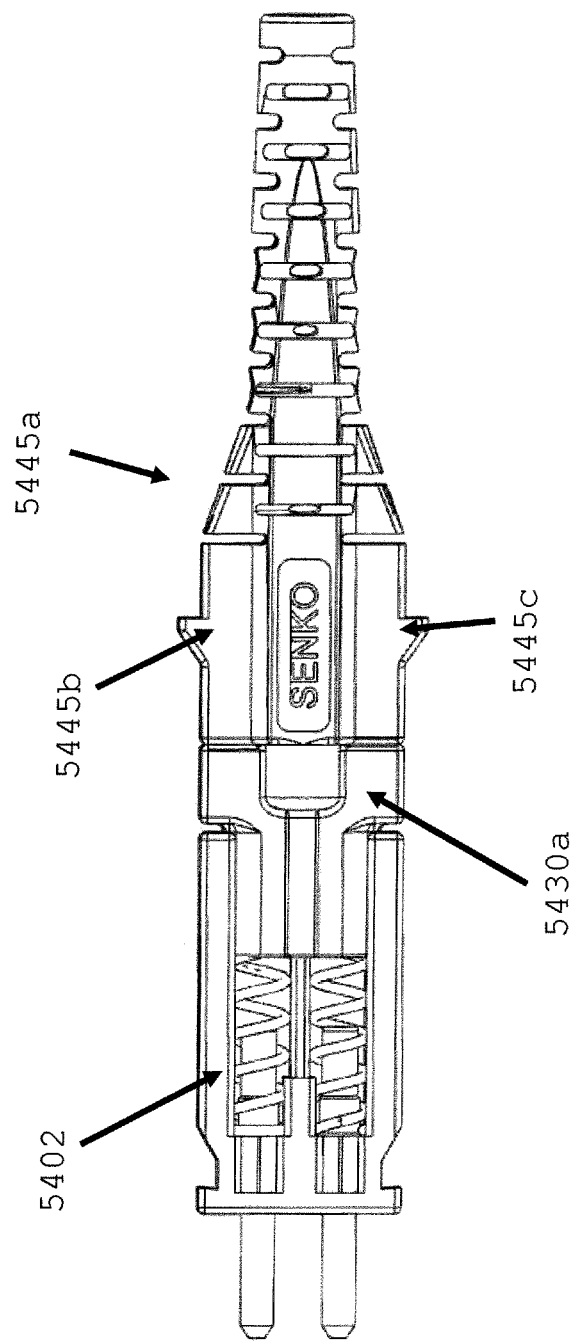
FIG. 39 is a side perspective inner view of a micro connector of FIG. 37 without an outer housing.

FIG. 39 depicts connector of FIG. 37 without its outer housing 5301, in an assembled configuration. Boot assembly 5445a is secured on back post 5430c of back body 5430a via crimp ring 5440a, as described in FIG. 38. Wings (5445b, 5445c) secure FIG. 39 assembly within outer housing 5301, and during release of connector 5300 from a receptacle, wings (5445b, 5445c) pull back outer housing a specific distance "d", which releases adapter/receptacle hook or latch 5625 that is seated in recess 5611 (refer to FIG. 40), while connector 5300 is secured within receptacle 2400. Front body 5402 is secured to connector housing 5401 with back body 5430a secured to a distal end of front body 5402, as described in FIG. 1 and elsewhere in this disclosure.

Figure 40:
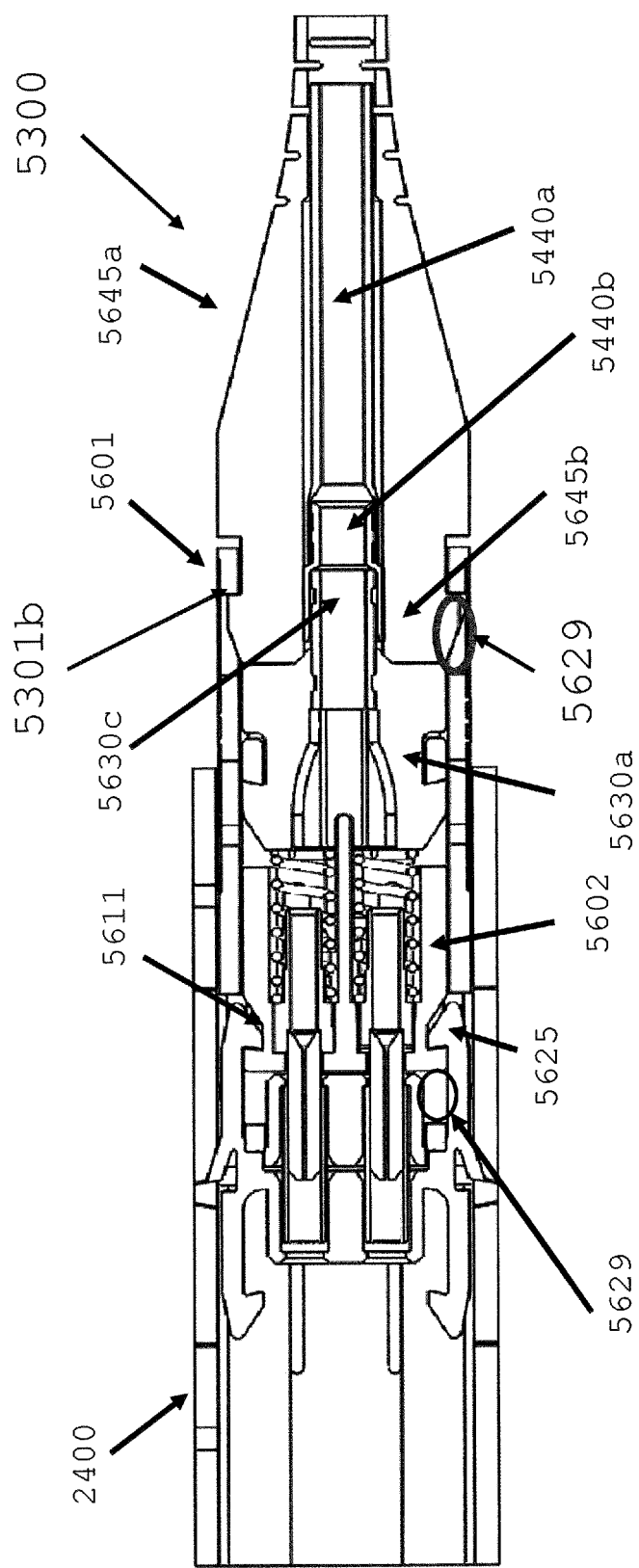
FIG. 40 is a cross-section view of connector of FIG. 37 latched into a receptacle.

FIG. 40 depicts connector 5300 secured within receptacle 2400 of FIG. 24. Receptacle hook or latch 5625 rests in connector recess 5611 formed within front body 5601, at its proximal end. A gap of distance "d" 5629 limits travel of front body 5601 as boot release wing 5645b engages stop face 5301b of outer housing 5601. This "d" travel removes hook 5625 from connector recess 5611 thereby unlatching or releasing connector from adapter 2400. Crimp ring 5440b is shown secured to back post 5630c. Back body 5630a is secured within front body 5402 at distal openings 5401b (FIG. 38).

Figure 42:
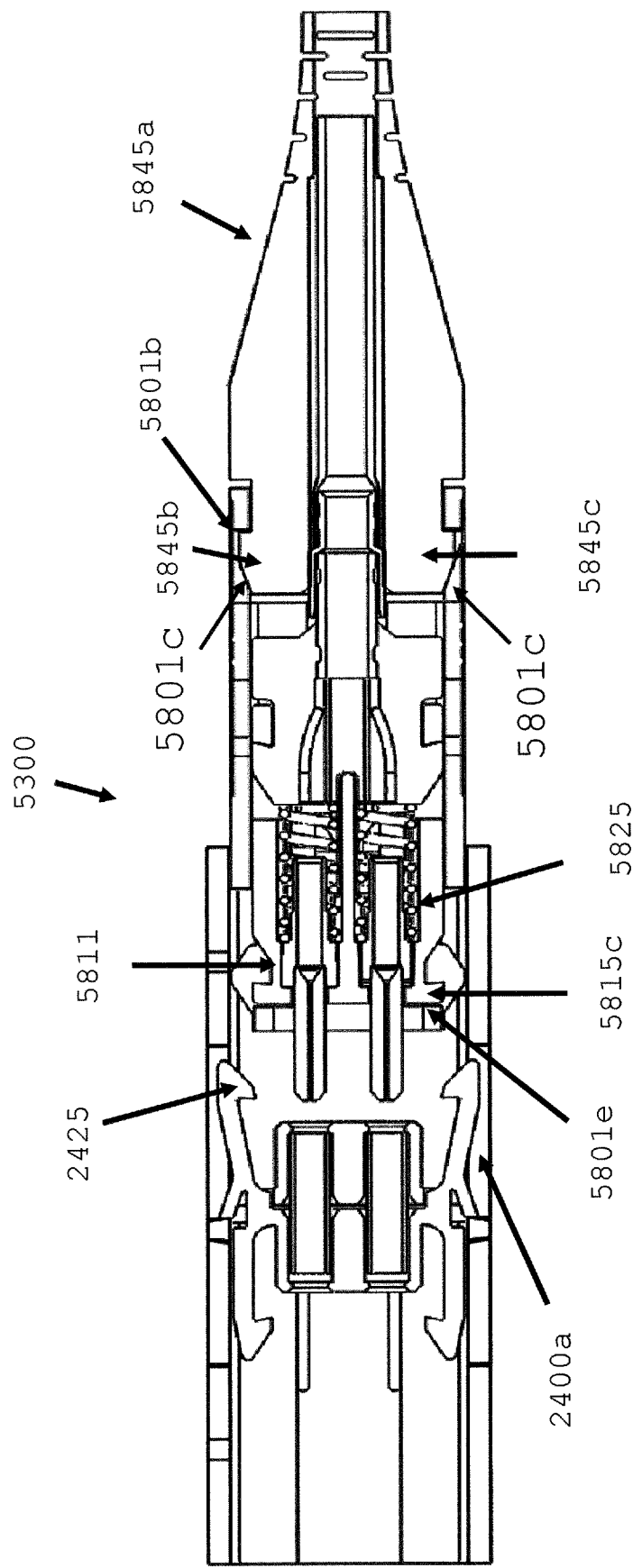
FIG. 42 is a cross-section view of connector of FIG. 37 released from an adapter receptacle.

FIG. 41 depicts connector 5300 being removed or pulled out of receptacle 2400 in direction "P". Hook or latch 2425 within receptacle housing lifts out of recess 5711 along front body ramp 5401d (FIG. 38), as boot assembly 5745a is being pulled rearward or in a distal direction. Gap 5529 is closed as shown in FIG. 41. Inner face of connector housing 5715c is flush with front face of front body 5701e, which stops travel of boot assembly and is configured to ensure adapter latch or hook 2425 is displaced from recess 5711 to release connector from receptacle, as shown in FIG. 42. Boot wing 5745c is secured at a distal end within second slot or opening 5401.4 within connector housing 5401.

FIG. 42 depicts connector 5300 removed from receptacle 2400 using boot assembly 5845a. In this embodiment, wings (5845b, 5845c) are flush with outer housing wall 5801b. Wings (5845b, 5845c) move within gap or opening 5801c within connector housing outer wall, as boot 5845a is pulled rearward to release connector from adapter 2400 as shown. Spring 5825 biases forward front body face 5815c to be flush with front body face 5801e, when pull force is released from boot assembly. Hook or latch 2425 is displaced from recess 5811, and hook resides in adapter housing gap 2400a within outer housing of receptacle 2400. This reduces the overall dimensions of the adapter to accept more connectors.

Figure 44:
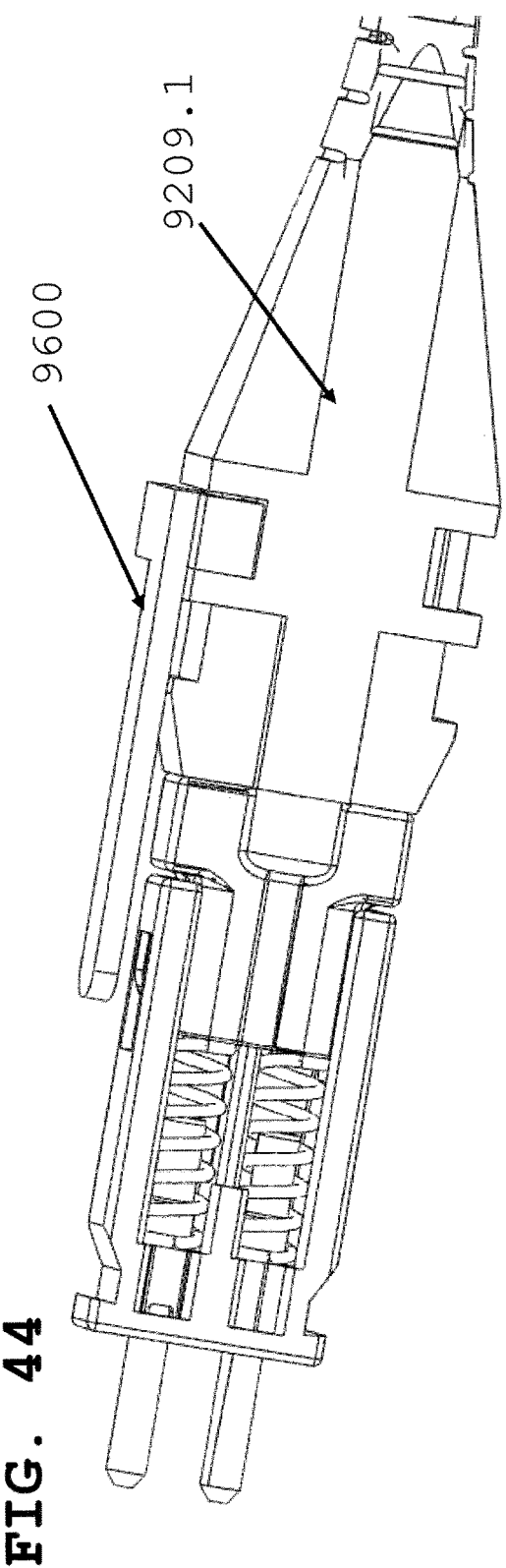
FIG. 44 is an assembly view of the micro connector of FIG. 43 in a first polarity.
Figure 45:
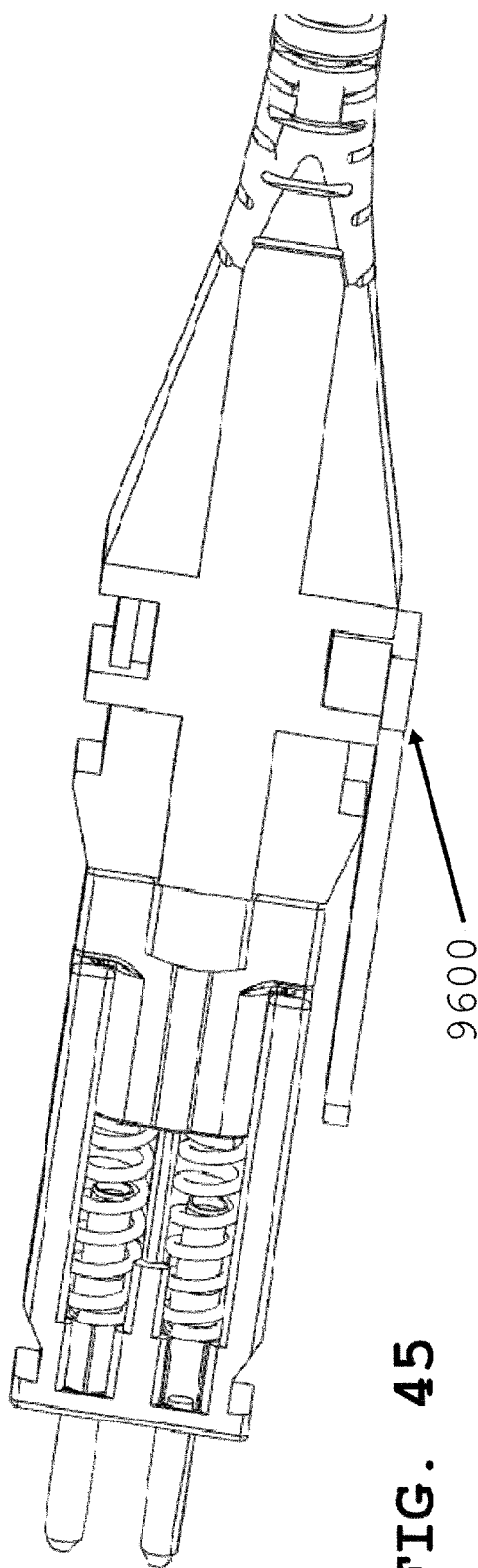
FIG. 45 is an assembled view of the micro connector of FIG. 43 in a second polarity.

Referring to FIG. 43, another embodiment of a polarity change is disclosed using alignment and offset key 9600. Alignment and offset key 9600 is releasably attached to boot clip surface 9975 as shown by the dotted line. Attaching key 9600 to a first side of the boot 9209.1, connector 9100 is in first polarity configuration, and attaching key 9600 to a second side, connector 9100 is in a second polarity configuration. Referring to FIG. 44, a first polarity configuration is assembled key 9600 is attached to boot 9209.1 of connector 9100. Referring to FIG. 45, a second polarity configuration is assembled with key 9600 is attached to the opposite side of boot 9209.1.

In the above detailed description, reference is made to the accompanying drawings, which form a part hereof. In the drawings, similar symbols typically identify similar components, unless context dictates otherwise. Other embodiments may be used, and other changes may be made, without departing from the spirit or scope of the subject matter presented herein.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more").

The invention claimed is:

1. An optical fiber connector comprising:
a front body configured to hold first and second ferrules;
a back body having a proximal end portion and a distal end portion spaced apart along a longitudinal axis, the proximal end portion of the back body configured to couple to the front body, the back body defining a back body passageway extending from the distal end portion through the proximal end portion; and
a rotatable boot assembly having a proximal end portion and a distal end portion spaced apart along the longitudinal axis, the rotatable boot assembly comprising a main body and a strain relief sleeve extending longitudinally from the main body to the distal end portion of the rotatable boot assembly, the rotatable boot assembly comprising a boot passageway extending from the distal end portion through the main body, the rotatable boot assembly configured to be disposed on the back body such that the cable boot member is slidable along the longitudinal axis relative to the back body for releasing the optical fiber connector from an adapter, the optical fiber connector being configured to terminate a fiber optic cable such that a jacket of the cable is received in the strain relief sleeve in the boot passageway, the boot passageway and the back body passageway configured to align for passing first and second fibers from the fiber optic cable to the front body to complete a signal path to the first and second ferrules within the front body; the main body being configured to releasably secure the multi-purpose rotatable boot assembly against rotation relative to the back body, and the rotatable boot assembly further comprising an elongate arm extending longitudinally from the main body in a proximal direction along the longitudinal axis, the elongate arm being configured for selectively setting the optical fiber connector to each of a first polarity and a second polarity.

2. The optical fiber connector according to claim 1, wherein the elongate arm is an alignment key.

3. The optical fiber connector according to claim 2, wherein the alignment key aligns the proximal end of the optical fiber connector into the adapter.

4. The optical fiber connector according to claim 2, wherein the alignment key further comprises an offset key, the offset key stabilizes the distal ends of the fiber optic connector and the second fiber optic connector.

5. The optical fiber connector according to claim 1, wherein the main body further comprises first and second boot hooks configured to releasably couple the multi-purpose rotatable boot assembly to the back body.

6. The optical fiber connector according to claim 5, wherein the first and second boot hooks are spaced apart on diametrically opposite sides of the longitudinal axis.

7. The optical fiber connector according to claim 5, wherein when the rotatable boot assembly is disposed on the back body, the first and second boot hooks are spaced apart on diametrically opposite sides of the back body passageway and radially overlap the back body passageway relative to the longitudinal axis.

8. The optical fiber connector according to claim 5, wherein the first and second boot hooks are releasable to allow the rotatable boot assembly to rotate on the fiber optic cable 180° about the longitudinal axis from a first polarity position in which the elongate arm sets the optical fiber connector to the first polarity to a second polarity position in which the elongate arm sets the optical fiber connector to the second polarity.

9. The optical fiber connector according to claim 8, wherein when the rotatable boot assembly is in the first polarity position, the first boot hook is on a first side of the back post and the second boot hook is on a second side of the back post; and wherein when the boot assembly is in the second polarity position, the first boot hook is on the second side of the back post and the second boot hook is on the first side of the back post.

10. The optical fiber connector according to claim 8, wherein the elongate arm is connected to the main body to rotate with the main body as the rotatable boot assembly rotates between the first polarity position and the second polarity position.

11. The optical fiber connector according to claim 5, wherein the first boot hook and the elongate arm are radially spaced apart from the longitudinal axis in a first direction and the second boot hook is radially spaced apart from the longitudinal axis in a second direction opposite the first direction.

12. The optical fiber connector according to claim 1, wherein the rotatable boot assembly is configured to rotate on the fiber optic cable 180° about the longitudinal axis from a first polarity position in which the elongate arm sets the optical fiber connector to the first polarity to a second polarity position in which the elongate arm sets the optical fiber connector to the second polarity.

13. The optical fiber connector according to claim 12, wherein the elongate arm is connected to the main body to rotate with the main body as the rotatable boot assembly rotates between the first polarity position and the second polarity position.

14. The optical fiber connector according to claim 13, wherein the front body holds the first and second ferrules such that the first ferrule is radially spaced apart from the longitudinal axis in a first direction and the second ferrule is radially spaced apart from the longitudinal axis in a second direction opposite the first direction.

15. The optical fiber connector according to claim 14, wherein when the rotatable boot assembly is in the first polarity position, the elongate arm is radially spaced apart from the longitudinal axis in the first direction; and wherein when the rotatable boot assembly is in the second polarity position, the elongate arm is radially spaced apart from the longitudinal axis in the second direction.

16. The optical fiber connector according to claim 14, wherein the front body comprises a contiguous ferrule support wall extending transverse to the longitudinal axis and having a first end portion radially spaced apart from the longitudinal axis in the first direction and a second end portion radially spaced apart from the longitudinal axis in the second direction, the ferrule support wall defining a first ferrule opening radially spaced between the first end portion and the longitudinal axis and a second ferrule opening radially spaced between the longitudinal axis and the second end portion, the front body configured to receive the first ferrule in the first opening and the second ferrule in the second opening.

17. The optical fiber connector of claim 16, wherein the front body further comprises a first elongate portion extending longitudinally from the first end portion of the ferrule support wall and a second elongate portion extending longitudinally from the second end portion of the ferrule support wall, the first and second elongate portions having distal end segments that define an undivided space between them that opens longitudinally through a distal end of the front body.

18. The optical fiber connector according to claim 17, wherein the proximal end portion of the back body is configured to be received in the undivided space between the distal end segments of the first and second elongate portions.

19. The optical fiber connector according to claim 1, wherein the back body passageway and the boot passageway form a single, undivided longitudinal passage through which the first and second fibers are passable from the cable to the first and second ferrules.

20. The optical fiber connector according to claim 1, wherein the back body passageway comprises a distal segment along the back post, a proximal segment along the proximal end portion of the back body, and a transition segment between the distal segment and the proximal segment, wherein the back body passageway has a first inner dimension along a first radial axis and a second inner dimension along a second radial axis perpendicular to the first radial axis, wherein along the distal segment, the back body passageway is substantially circular such that the first inner dimension is about the same as the second inner dimension;

wherein along the proximal segment, the back body has a cross-sectional shape that is elongate along the first radial axis such that the first inner dimension is greater than the second inner dimension; and wherein along the transition segment, as the back body passageway extends in the proximal direction along the longitudinal axis, the first inner dimension increases by a greater amount than the second inner dimension.

\* \* \* \* \*